United States Patent
Kim et al.

(10) Patent No.: US 8,503,454 B2
(45) Date of Patent: Aug. 6, 2013

(54) APPARATUS AND METHOD FOR SETTING UP QUALITY OF SERVICE IN A WIRELESS COMMUNICATION SYSTEM

(75) Inventors: Ki-Back Kim, Seongnam-si (KR); Ji-Cheol Lee, Yongin-si (KR); Jung-Shin Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 911 days.

(21) Appl. No.: 12/112,817

(22) Filed: Apr. 30, 2008

(65) Prior Publication Data

US 2008/0274729 A1    Nov. 6, 2008

(30) Foreign Application Priority Data

May 4, 2007    (KR) .................. 10-2007-0043757
Sep. 28, 2007  (KR) .................. 10-2007-0097743

(51) Int. Cl.
*H04L 12/28* (2006.01)
*H04B 7/216* (2006.01)

(52) U.S. Cl.
USPC .................. 370/395.21; 370/342; 370/395.2

(58) Field of Classification Search
USPC ............................ 370/342, 395.21
See application file for complete search history.

(56) References Cited

U.S. PATENT DOCUMENTS

| | | | |
|---|---|---|---|
| 2006/0039313 A1* | 2/2006 | Chou et al. ............... | 370/328 |
| 2006/0120355 A1* | 6/2006 | Zreiq et al. ............... | 370/352 |
| 2007/0211694 A1* | 9/2007 | Rasanen .................. | 370/352 |
| 2008/0002592 A1* | 1/2008 | Yegani et al. ............ | 370/252 |
| 2008/0002608 A1* | 1/2008 | Zheng et al. ............. | 370/328 |
| 2008/0101376 A1* | 5/2008 | Do et al. .................. | 370/395.21 |

FOREIGN PATENT DOCUMENTS

KR    1020070016452 A    2/2007

OTHER PUBLICATIONS

IEEE std 802.16 (IEEE Standard for Local and metropolitan area networks), Part 16: Air Interface for Fixed Broadband Wireless Access Systems, Apr. 8, 2002, See sections 6.2.2.3.10.1-6.2.2.3.15 and 6.2.13.2-6.2.13.8.4.3.
TTAS.K0-06 .0082/R1 (TTA Standard, Specification for 2.3GHz band Portable Internet Service), Physical & Medium Access Control Layer, Dec. 21, 2005, See sections 6.3.2.3.10-6.3.2.3.18 and 6.3.14.4-6.3.14.9.4.3.

* cited by examiner

*Primary Examiner* — Noel Beharry
(74) *Attorney, Agent, or Firm* — Jefferson IP Law, LLP

(57) ABSTRACT

An apparatus and method for setting up Quality of Service (QoS) in a wireless communication system are provided. The method includes, during an initial network entry, generating at least one static Service Flow (SF) by receiving a QoS profile from a Base Station (BS), if QoS change is requested for the SF, transmitting by a Mobile Station (MS) to the BS a service change request message which requests a service change and includes QoS change information, and by the BS, determining if the service change request is granted, and, if granted, transmitting a service change response message to the MS, and changing a QoS of the SF.

41 Claims, 9 Drawing Sheets

APPARATUS AND METHOD FOR SETTING UP QUALITY OF SERVICE IN A WIRELESS COMMUNICATION SYSTEM

PRIORITY

This application claims the benefit under 35 U.S.C. §119(a) of a Korean patent application filed in the Korean Intellectual Property Office on May 4, 2007 and assigned Serial No. 2007-43757, and a Korean patent application filed in the Korean Intellectual Property Office on Sep. 28, 2007 and assigned Serial No. 2007-97743, the entire disclosures of both of which are hereby incorporated by reference.

BACKGROUND OF THE INVENTION

1. Field of the Invention

The present invention relates to an apparatus and method for setting up Quality of Service (QoS) in a wireless communication system. More particularly, the present invention relates to an apparatus and method for ensuring end-to-end QoS in a Broadband Wireless Access (BWA) communication system.

2. Description of the Related Art

There is a growing demand for services featuring various traffic capabilities, for example, a variety of multimedia application services (e.g., Voice over Internet Protocol (VoIP), real-time games, Video on Demand (VoD), etc.). With the increase in available types of services and the diversification in service level requirements of a user, communication systems now have to not only consider system capability but also Quality of Service (QoS). QoS represents user satisfaction. Moreover, since available resources vary in a wireless communication system due to a time-variable environment and a mobility of Mobile Stations (MSs), a policy for ensuring QoS is necessary.

Many wireless communication techniques are being proposed to achieve a high-speed mobile communication. Among them, an Orthogonal Frequency Division Multiplexing (OFDM) scheme is one of the next generation wireless communication techniques. The OFDM scheme is expected to be widely used as a future wireless communication technique, and is currently used as a standard in the Institute of Electrical and Electronics Engineers (IEEE) 802.16-based Wireless Metropolitan Area Network (WMAN) which is known as the 3.5 Generation (3.5G) technology.

However, the conventional Broadband Wireless Access (BWA) standard only defines an interoperation process of Media Access Control (MAC) layer QoS and does not provide a network interoperation process for ensuring end-to-end QoS that is noticeable to the user. In other words, in an IEEE 802.16-based network in which a PHYsical (PHY)/MAC layer is supported, only a DSx interoperation process between a Base Station (BS) and an MS is defined, wherein Dynamic Service Addition (DSA) represents service generation, Dynamic Service Deletion (DSD) represents service deletion, and Dynamic Service Change (DSC) represents service change.

End-to-end QoS of an application layer has to be ensured to enhance service quality that is noticeable to the user. Therefore, when using a BWA system in which only MAC layer QoS is defined, the interoperation process for QoS setup has to be defined among MSs, access networks, and core networks.

SUMMARY OF THE INVENTION

An aspect of the present invention is to address at least the above-mentioned problems and/or disadvantages and to provide at least the advantages described below. Accordingly, an aspect of the present invention is to provide an apparatus and method for ensuring end-to-end Quality of Service (QoS) in a Broadband Wireless Access (BWA) system.

Another aspect of the present invention is to provide an apparatus and method for setting up QoS between one or more of each of a Mobile Station (MS), an access network, and a core network in a BWA system.

Another aspect of the present invention is to provide an apparatus and method for statically allocating a Service Flow (SF) to an MS in a BWA system.

Another aspect of the present invention is to provide an apparatus and method for changing a QoS parameter of an SF statically allocated to an MS in a BWA system.

In accordance with an aspect of the present invention, a method of setting up QoS in a wireless communication system is provided. The method includes during an initial network entry, generating at least one static SF by receiving a QoS profile from a Base Station (BS), if a QoS change is requested for the SF, transmitting by an MS to the BS a service change request message which requests a service change and includes QoS change information, and by the BS, determining if the service change request is granted, and, if granted, transmitting a service change response message to the MS, and changing a QoS of the SF.

In the aforementioned aspect of the present invention, the changing of the QoS may include upon receiving the service change request message, performing Connection Admission Control (CAC) by the BS, if a connection is admitted, transmitting the service change response message by the BS to the MS, and reporting changed QoS information by the BS to an Access Service Network-GateWay (ASN_GW).

In addition, the changing of the QoS may include receiving information on an allowable range of a QoS parameter by an ASN_GW from a Network Entity (NE) including a Policy Decision Function (PDF), upon receiving the service change request message, performing CAC by the BS, if a connection is admitted, transmitting the QoS change information by the BS to the ASN_GW, by the ASN_GW, determining if the QoS change information exists within the allowable range, and, if the QoS change information exists within the allowable range, transmitting to the BS a response message which grants the QoS change, and upon receiving the response message, transmitting the service change response message by the BS to the MS.

In addition, the changing of the QoS may include upon receiving the service change request message, performing CAC by the BS, if a connection is admitted, transmitting the QoS change information by the BS to an NE including a PDF, by the NE, determining if the QoS change information exists within the allowable range, and, if the QoS change information exists within the allowable range, transmitting to the BS a response message which grants the QoS change, and upon receiving the response message, transmitting the service change response message by the BS to the MS.

In addition, the changing of the QoS may include performing authentication on the MS and triggering a policy server by an authentication sever, transmitting, by the policy server, information on an allowable range of a QoS parameter of the MS to an ASN_GW, upon receiving the service change request message, performing CAC by the BS, if a connection is admitted, transmitting by the BS to the ASN_GW the QoS change information, by the ASN_GW, determining if the QoS change information exists within the allowable range, and, if the QoS change information exists within the allowable range, transmitting to the BS a response message which grants the QoS change, and upon receiving the response message, transmitting the service change response message by the BS to the MS.

In addition, the changing of the QoS may include by an authentication server, performing authentication on the MS and transmitting a PDF input parameter to an ASN_GW, by the ASN_GW, generating information on an allowable range of a QoS parameter of the MS by using the PDF input parameter, upon receiving the service change request message, performing CAC by the BS, if a connection is admitted, transmitting the QoS change information by the BS to the ASN_GW, by the ASN_GW, determining if the QoS change information exists within the allowable range, and, if the QoS change information exists within the allowable range, transmitting to the BS a response message which grants the QoS change, and upon receiving the response message, transmitting the service change response message by the BS to the MS.

In accordance with another aspect of the present invention, a wireless communication system is provided. The system includes an MS for generating at least one static SF by receiving a QoS profile from a BS during an initial network entry, and, if a QoS change is requested for the SF, for transmitting a service change request message which requests a service change and includes QoS change information to the BS, and the BS for determining if the service change request is granted, and, if granted, for transmitting a service change response message to the MS.

In accordance with another aspect of the present invention, a method of setting up QoS of an Access Service Network (ASN) is provided. The method includes generating at least one static SF for an MS which performs an initial network entry, receiving from the MS a service change request message including QoS change information for the static SF, determining if the QoS change is granted, and if the QoS change is granted, transmitting a service change response message to the MS.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will become more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions will be omitted for clarity and conciseness.

Hereinafter, a technique for creating a Service Flow (SF) in a static (or provisioned) manner and for changing Quality of Service (QoS) of the SF created in the static (or provisioned) manner in a Broadband Wireless Access (BWA) system will be described. A technique for changing QoS of the SF created in the static (or provisioned) manner will be defined as "semi-dynamic QoS setup".

In the following descriptions, a Network Entity or Network Element (NE) is a term defined according to functions, and the term may vary depending on a standardization group or operator's intention. For example, a Base Station (BS) may be a Radio Access Station (RAS). In addition, an Access Service Network Gateway (ASN_GW) may be an Access Control Router (ACR). The ASN_GW may also function as a router.

Figure 1:
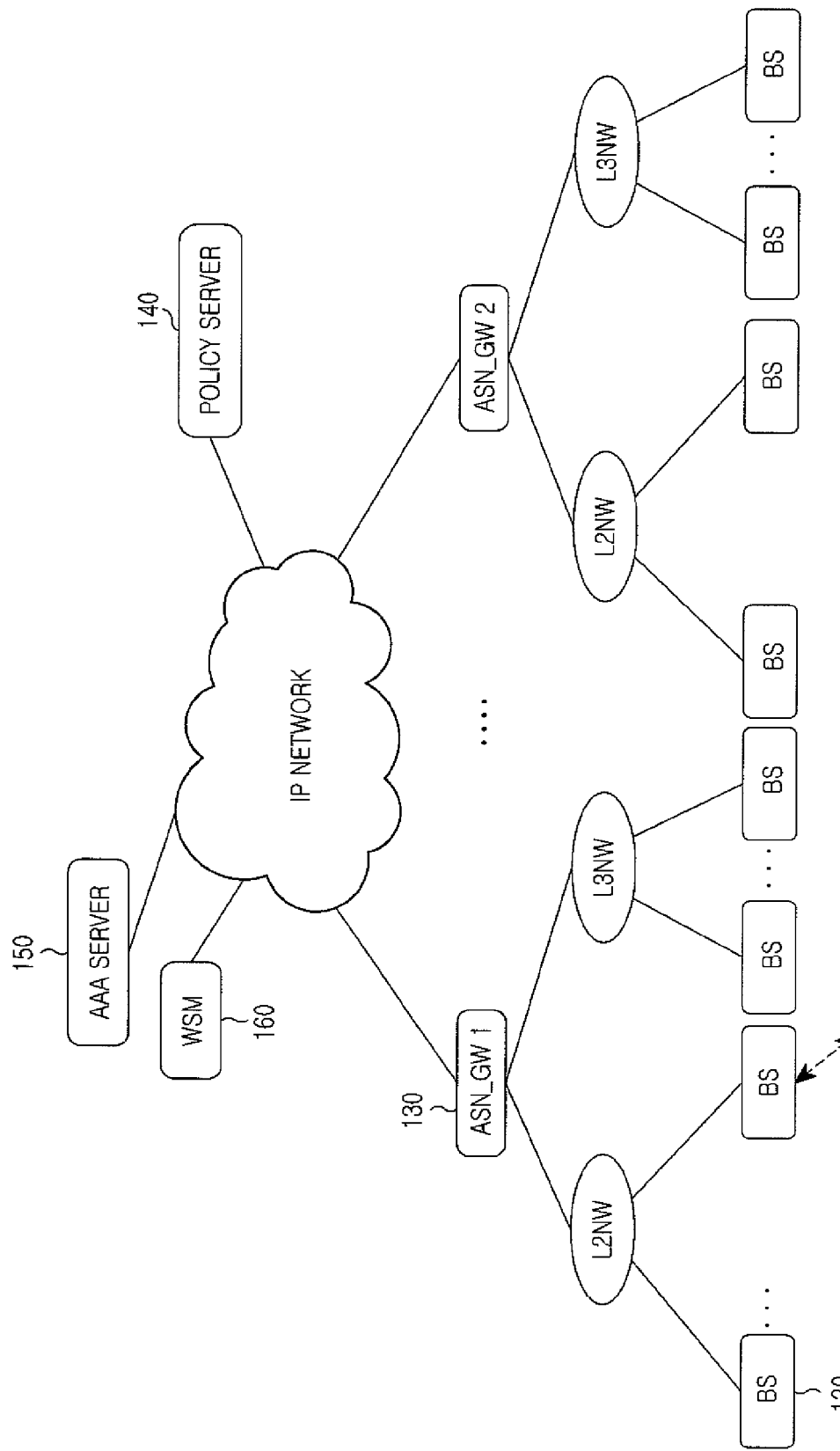
FIG. 1 illustrates a network configuration according to an exemplary embodiment of the present invention.

FIG. 1 illustrates a network configuration according to an exemplary embodiment of the present invention.

Referring to FIG. 1, the network is constructed of an MS 110, a BS 120, an ASN_GW 130, a policy server 140, an Authentication, Authorization, and Accounting (AAA) server 150, and a WiBro System Manager (WSM) 160. A network constructed of the BS 120 and the ASN_GW 130 may be defined as an Access Service Network (ASN). The WSM 160 may be referred to as an Element Management System (EMS). The policy server 140 may be constructed of a separate server as shown in the figure, or may be incorporated as an internal function of a specific network entity (e.g., the AAA server).

The AAA server 150 performs authentication and accounting on the MS 110 by interoperating with the ASN_GW 130. According to an exemplary embodiment of the present invention, when the authentication on the MS is successful, the AAA server 150 transmits a Dynamic Service Addition (DSA) trigger request message to the ASN_GW 130. Upon transmitting the DSA trigger request message, the AAA server 150 may provide the ASN_GW 130 with any one of a user class IDentifier (ID) for the MS 110, QoS profile IDs (i.e., multiple service profile IDs) of SFs allocated to the MS 110, and QoS parameter sets allocated to the MS 110. The service profile IDs and the QoS parameter sets are output parameters of a Policy Decision Function (PDF). If the output parameters are provided, the AAA server 150 may include the PDF. The AAA server 150 can provide an allowable range of a QoS parameter to the ASN_GW 130. Even if the same service type is used, the allowable range may be different according to a user class or a state (i.e., admitted, active, provisioned, etc.) of the SF. A Common Open Policy Service (COPS) interface, a Remote Authentication Dial In User Service (RADIUS) interface, or a diameter interface may be used between the AAA server 150 and the ASN. User information may be managed by a Subscription Profile Repository (SPR) server. In this case, a user class ID may be provided by the SPR server. An SPR function may be incorporated into the AAA server 150 or another server or may be independently provided by a separate server.

When the AAA server 150 transmits a service profile ID for the MS 110 to the ASN_GW 130, a plurality of service profile IDs may be transmitted for one message. Likewise, when the ASN_GW 130 transmits the DSA trigger request message to the BS 120, a plurality of service profile IDs (or a plurality of Service Flow IDentifiers (SFIDs)) may be transmitted for one message. When the BS 120 performs a DSA process with respect to the MS 110 in a wireless fashion, a call process for a plurality of SFs can be performed by using one DSA message. For example, when ten SFs are generated, a size of a DSA-REQuest (REQ) message can be maximized in such a manner that a specific reference SF is selected, then a QoS parameter and a Classification (CS) rule are all described for the selected SF, and parameters other than those of the reference SF are described for the remaining SFs. In this case, information on the plurality of SFs may exist within one message in an array format.

Further, the AAA server 150 performs accounting on the MS 110. An accounting statistic period is defined as a period in which an SF is activated in practice. For example, when the MS moves, a start point, a middle point, and an end point of a traffic flow may be managed by different ASN_GWs. In this case, each ASN_GW reports an actual serving time to the AAA server 150. For another example, whenever an ASN_GW that serves to perform call processing is changed, accounting statistic information, which has been gathered so, far may be delivered to a target ASN_GW, and an ASN_GW at the end point may report the gathered accounting statistic information to the AAA server 150. If a Subscriber Identity Module (SIM) card is included in the MS 110, the AAA server 150 may transmit the accounting statistic information gathered from the ASN_GW 130 to the MS 110 through an application layer. In this case, the accounting is performed in the SIM card of the MS 110. For another example, the accounting may be performed by the SIM card itself. In this case, the accounting statistic information may be gathered by the MS 110 itself, or may be provided from the ASN_GW 130.

An accounting rule may be determined to be the same as or different from the CS rule. Similar to the CS rule, the accounting rule is determined by a service provider by using the WSM 160 (or an Operation Maintenance Center (OMC) or an EMS). The determined CS rule may be delivered by the WSM 160 to the ASN_GW 130, may be delivered by the AAA server 150 to the ASN, may be delivered by the policy server 140 to the ASN, or may be determined in the SIM card of the MS 110. The CS rule may be managed only by the ASN in the downlink, and may be managed only by the MS in the uplink. The accounting rule may be managed by the ASN or the MS 110 according to an entity (i.e., the ASN or the MS) for gathering statistic information. If the ASN is the entity for gathering statistic information, the accounting rule is managed by the ASN in both the downlink and the uplink. If the MS is the entity for gathering statistic information, the accounting rule may be managed by the MS in both the downlink and the uplink.

The policy server 140 provides QoS mapping information input from a service provider (or operator) to the ASN_GW 130 and the BS 120. For example, the QoS mapping information may include a service profile set (or group) for each user class and a QoS parameter set (or group) for each service profile. The user class may be classified into premium, gold, silver, bronze and the like. The number of SFs for each user class may differ from one another. For example, four QoS flows (e.g., Unsolicited Grant Service (UGS), non-real-time Polling Service (nrtPS), real-time Polling Service (rtPS), and extended-real-time Polling Service (ertPS)) may be allocated for a premium user, and three QoS flows may be allocated for a gold user. QoS parameters (i.e., data rate, data size, latency, jitter, etc.) may differ from one another according to the user class even if the same type of a QoS flow (i.e., SF) is used. The COPS interface, the RADIUS interface, or the diameter interface may be used between the policy server 140 and the ASN.

The policy server 140 may provide the ASN_GW 130 with the service profile IDs for the MS 110, the QoS parameter set, or the CS rule. Specifically, upon completing a registration process with respect to the MS, the ASN_GW 130 delivers a user ID to the policy server 140, and the policy server 140 delivers the user ID to the SPR server to obtain user information (e.g., a user class). In addition, the policy server 140 determines one of the service profile IDs for the MS, the QoS parameter set, and the CS rule by using the obtained user information, and delivers the determination result to the ASN_GW 130. The exemplary embodiment of the present invention has an advantage in that the policy server 140 can manage both a static QoS setup method and a dynamic QoS setup method. The user ID may be delivered to the policy server 140 before or after an Internet Protocol (IP) allocation process. Alternatively, the user ID may be delivered when a process of setting up an IP Connection Access Network (CAN) session is performed between an anchor ASN_GW and the policy server 140 after the IP allocation process.

The WSM 160 delivers information related to the network configuration to the ASN, and manages the ASN_GW 130 and the BS 120, which make up the ASN. According to an exemplary embodiment of the present invention, the PDF may be included in the WSM 160. In this case, the WSM 160 provides the ASN_GW 130 and the BS 120 with QoS mapping information input by the service provider (or operator).

The ASN_GW 130 transmits to the BS 120 traffic from a core network, and transmits to the core network traffic from the BS 120. In this case, the ASN_GW 130 manages the SF, connection, and mobility with respect to each MS 110. A unique SF is generated for each of the uplink and the downlink connections. According to an exemplary embodiment of the present invention, the ASN_GW 130 manages the QoS mapping information received from the policy server 140 or another NE (including PDF) in a form of a mapping table (or a database). When the DSA trigger request message is received for a specific MS from the AAA server 150, the ASN_GW 130 generates a static SF for the MS by using the mapping table, delivers an SFID to the BS 120, and thus transmits the DSA trigger request message. For example, the DSA trigger request message received from the core network may include an IP QoS parameter, and the ASN_GW 130 may map the IP QoS parameter to a Media Access Control (MAC) QoS parameter by using the mapping table. Further, the ASN_GW 130 may deliver the DSA trigger message to the BS 120 along with the SFID and the MAC QoS parameter.

The BS 120 transmits to the MS 110 traffic from the ASN_GW 130, and transmits to the ASN_GW 130 traffic from the MS 110. The BS 120 may be coupled to the ASN_GW 130 in a wired fashion, and may be coupled to the MS 110 in a wireless fashion. The BS 120 performs scheduling according to MAC layer QoS, and thus allocates resources to the MS 110. According to an exemplary embodiment of the present invention, the BS 120 can manage the QoS mapping information, which is received from the policy server 140 or another NE (including PDF), in a form of a mapping table. In this case, when the DSA trigger request message is received from the ASN_GW 130, the BS 120 obtains a QoS parameter from the mapping table by using the SFID provided from the ASN_GW 130, and performs the DSA process with respect to the MS 110 by using the QoS parameter. As such, an SF is generated by performing the DSA process, and the SF is activated in practice by performing a Dynamic Service Change (DSC) process. That is, upon receiving a DSC-REQ from the MS 110, the BS 120 performs Connection Admission Control (CAC), allocates a Transport Connection IDentifier (TCID), and transmits traffic by using the TCID. In addition, according to an exemplary embodiment of the present invention, a QoS parameter of an SF statically allocated to the MS can be changed. The change of the QoS parameter is also performed by the DSC process (at the request of the BS 120 or MS 110). The QoS parameter change process will be described below in a greater detail, and thus detailed descriptions thereof will be omitted herein.

Meanwhile, the ASN manages a mode (i.e., null, awake, sleep, and idle) of each MS 110. When an MS 110, to which an SF is statically allocated, transitions to the idle mode, only an SFID can be maintained for that MS 110. When the MS 110 transitions from the idle mode to the awake mode through a Quick Connection Setup (QCS), the BS 120 delivers a RaNginG-ReSPonse (RNG-RSP) message including "SFID vs TCID" information to the MS 110. Since the MS 110 already has the SFID and QoS information, for management, the MS 110 maps SFIDs to corresponding TCIDs. The TCID is uniquely allocated for each flow in the BS 120. The SFID is unique for each flow in the MS 110. A network between the ASN_GW 130 and the BS 120 may be a Layer 2 (L2: Ethernet) network or a Layer 3 (L3: IP) network as shown in FIG. 1.

During an initial network entry, the MS 110 performs the DSA process with respect to the BS 120 and thus generates a static SF. When a specific SF needs to be activated, the MS 110 performs the DSC process with respect to the BS 120, and thus the TCID is allocated. Then, the MS 110 uses the TCID for traffic communication. In addition, when QoS of the SF needs to be changed, the MS 110 performs the DSC process with respect to the BS 120 and thus changes the QoS parameter.

When the MS 110 in the awake or the sleep mode moves to another subnet, it is assumed that an anchor ASN_GW 130 (or an ASN_GW 130 that serves to manage a Foreign Agent (FA)) is not changed. In this case, a QoS profile for the MS 110 is delivered to a new serving BS 120 through tunneling or L2 extension. When an MS 110 in the idle mode moves to another subnet, it is assumed that the anchor ASN_GW 130 is changed but the SFID is maintained without alteration. In this case, a QoS profile for the MS 110 is delivered from a previous anchor ASN_GW 130 to a target anchor ASN_GW 130. When the previous anchor ASN_GW 130 and the target anchor ASN_GW 130 interoperate with the same AAA server 150, the previous anchor ASN_GW 130 may deliver information (i.e., user class IDs or SFIDs), which is transmitted from the AAA server 150 to the ASN_GW 130, to the target anchor ASN_GW 130 instead of the QoS profile. Even if ASN_GWs 130 or BSs 120 operate by using the same PDF, a QoS setup method (i.e., semi-dynamic QoS setup, static QoS setup, etc.) may be different. Thus, considering this situation, the information delivered from the previous anchor ASN_GW 130 to the target anchor ASN_GW 130 is preferably a CS parameter and a QoS profile.

When the MS 110 moves to another network having a different AAA server 150, the anchor ASN_GW 130 is changed. In this case, the PDF may be used without alternation. Alternatively, only QoS information may be changed while the number of admitted flows is not altered. When the QoS information is changed, all CS parameters and QoS information are delivered to the target anchor ASN_GW 130 to ensure seamless QoS. When the PDF is significantly different so that the DSC cannot correct the difference, the MS has to perform again the initial network entry.

A translation AAA may be provided for transmission between AAA servers 150 whose classes are classified by using different methods. Basically, an accounting policy allows accounting only for flows used by a previous network or a target network. For example, the target network may have an accounting policy in which an AAA server 150 of the target network performs accounting on the basis of accounting statistic information provided from the target ASN_GW 130 according to a time and amount of use for each SF and may report the accounting result to an AAA server 150 of the previous network. For another example, only the time and amount of use are reported, and the AAA server 150 of the previous network may perform accounting and thereafter pay a cost obtained from the accounting to a service provider of the target network.

Although not shown in FIG. 1, it is apparent that NEs (i.e., a Dynamic Host Configuration Protocol (DHCP), a Home Agent (HA), and a Foreign Agent (FA)) for allocating an IP address to the MS 110 and a Domain Name Server (DNS) for managing a mapping relation between a Network Access Identifier (NAI) and the IP address can be provided.

Detailed operations will be described after the input and output parameters of the PDF are defined.

Examples of a PDF input parameter may include a 5-tuple (i.e., a source & destination IP address, a source & destination port number, and a protocol ID), a 6-tuple (i.e., 5-tuple+Type of Service (ToS)), and a user class (e.g., premium, gold, silver, bronze, etc.). The 5-tuple and the 6-tuple are used to distinguish a flow, and thus have to be delivered to an NE (e.g., an ASN_GW) which serves to manage a CS rule.

A PDF output parameter may be defined as a QoS parameter set (or group) for an IP QoS (i.e., a DiffServ Code Point (DSCP)) and for a MAC QoS (e.g., Institute of Electrical and Electronics Engineers (IEEE) 802.16 QoS parameters). Examples of the IEEE 802.16 QoS parameters include a traffic priority, a maximum sustained rate, a minimum reserved rate, a maximum latency, a grant interval, etc.

In addition to the aforementioned PDF output parameter, QoS parameters may be additionally provided as defined in Table 1 below.

TABLE 1

| Parameter | Description |
| --- | --- |
| for indicating compression or non-compression of an IP header and a compression scheme | 1) uncompressed<br>2) Payload Header Suppression (PHS) scheme<br>3) RObust Header Compression (ROHC) scheme |
| for indicating use or non-use of a Traffic Encryption Key (TEK) | security items |
| for indicating whether a current state is a pre-provisioned state | set for each MS |
| parameter selecting one of provisioned, admitted, and active states for each flow if the current state is not the pre-provisioned state | provisioned: generate only SFID<br>admitted/active: allocate TCID by performing CAC during initial network entry |
| for indicating grant or denial of QoS change by using DSC | 1) Increase or decrease in a parameter value can be selectively determined.<br>2) allowable range of QoS change includes changes in a service type (e.g., nrtPS->UGS) |
| for indicating the number of times of changing QoS in the active state | |
| for indicating a processing scheme for a QoS parameter which is not exchanged by using the DSC | 1) scheme which reuses previous values<br>2) scheme which uses system default values<br>3) scheme which ignores QoS parameters |
| for indicating reliability | e.g., target error rate |
| for indicating condition for compulsorily releasing a call | continuous time threshold in a state in which a minimum reserved rate is not satisfied |
| for indicating a retransmission scheme (i.e., ARQ, HARQ) | |
| for indicating a processing scheme when the number of users in an awake mode in a serving BS exceeds a threshold | 1) allow a user, who has a low priority among previously connected users and to which traffic has not been flown for a specific time period, to transition to a sleep or idle mode and allow an initially connected user to transition to the awake mode<br>2) upon completing initial network entry, allow a corresponding user to transition to the sleep mode<br>3) upon completing initial network entry, allow a corresponding user to transition to the idle mode<br>4) compare the number of users in the sleep mode of the serving BS with the threshold, and if the number of users does not exceed the threshold, transition to the sleep mode, and otherwise, if the number of users exceeds the threshold, transition to the idle mode |
| for indicating whether a symmetric QoS flow is provided | Indicate whether a caller can increase a service level of a corresponding MS to the same level as the caller when a bidirectional service (e.g., VoIP) is performed on the MS having a relatively low service level.<br>When a call ends, an ASN_GW, which manages a recipient, deletes temporarily allocated QoS information.<br>The MS allows a QoS profile to be automatically restored to an original QoS profile after the call ends, or updates the QoS profile by receiving the original QoS profile according to a DSC process at the request of the BS. |
| for indicating a possible maximum number of times of using the DSC for each flow | |
| for indicating grant or denial of a flow timer, which is used for transition from the active state to the provisioned state, and a timer value | A timer (e.g., sleep timer, idle timer, etc.) for each MS has a priority over a flow timer. If the timer for each MS does not additionally exist, transition to the sleep (or idle) mode can be made when timers of all flows exceed a sleep (or idle) transition time values. |
| for indicating possibility of horizontal handover to a different service provider's network using the same wireless technique | |
| for indicating possibility of vertical handover to a different wireless network using a different wireless technique | |
| for indicating grant or denial of DSD | |

In Table 1 above, the "pre-provisioned" state is defined as a state in which all SFs belonging to an MS are activated in the initial network entry. In this case, if all SFs are admitted through CAC, not only an SFID but also a TCID is allocated, and if any one of the SFs is denied, the initial network entry may be dealt with as failure. The parameters of Table 1 above are only for exemplary purposes, and may vary depending on a standardization group or service provider's (or operator's) intention. For example, although not described in Table 1 above, other parameters (e.g., indicating whether to fragment is performed for MAC/PHYsical (PHY) layer-related parameters, whether to packing, whether to compress, a compression scheme, etc.) may be further included.

Figure 2:
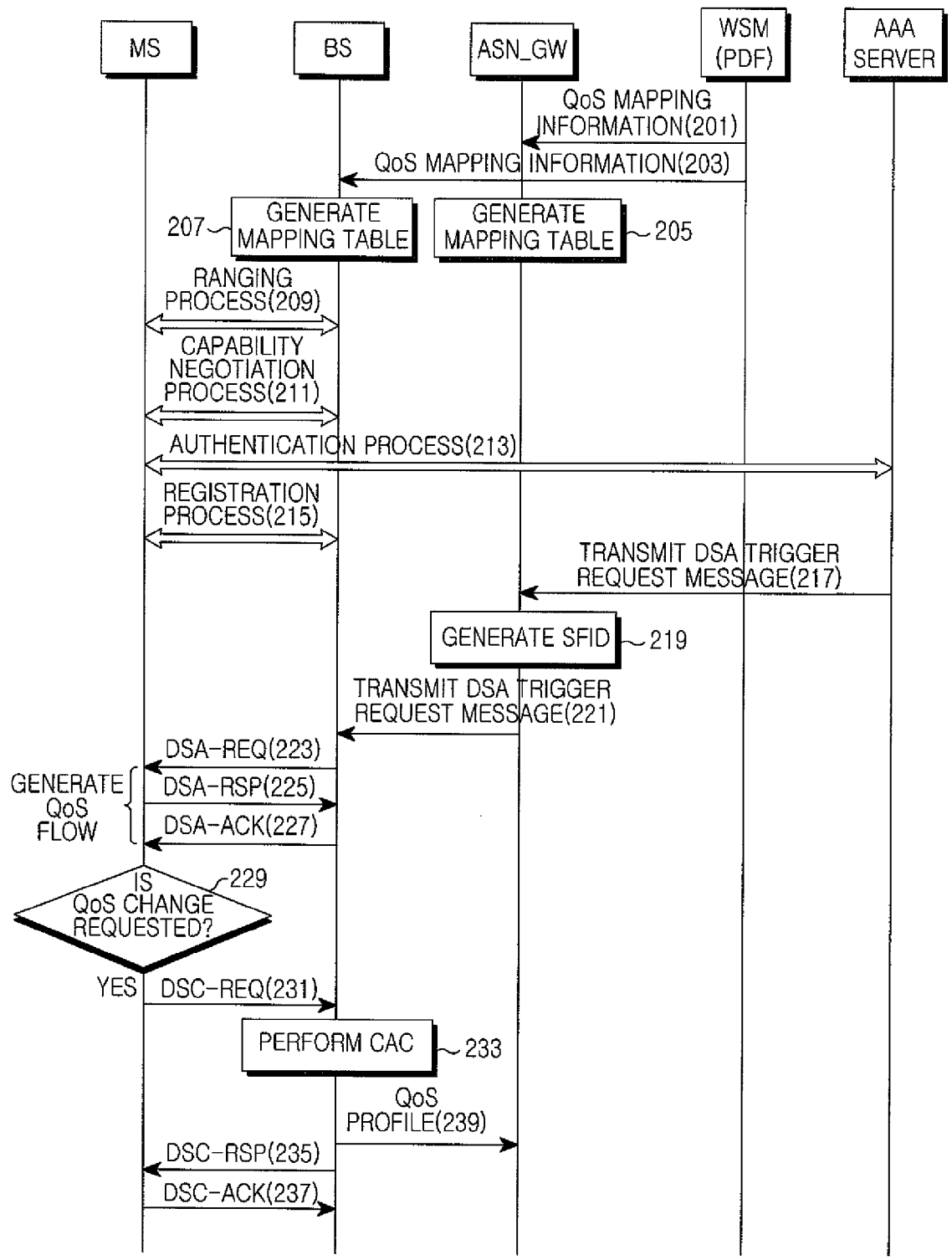
FIG. 2 illustrates a Quality of Service (QoS) setup process in a wireless network according to an exemplary embodiment of the present invention.

FIG. 2 illustrates a QoS setup process in a wireless network according to an exemplary embodiment of the present invention. In FIG. 2, a PDF is included in a WSM, and whether to perform QoS change is determined by performing CAC in a BS.

Referring to FIG. 2, the WSM provides QoS mapping information input by a service provider (or operator) to an ASN_GW in step 201. In step 203, the WSM provides the QoS mapping information to the BS. Although it is described that the WSM provides the QoS mapping information separately to the ASN_GW and the BS, the WSM may deliver the QoS mapping information to the ASN_GW, and the ASN_GW may provide the QoS mapping information to the BS. Alternatively, the QoS mapping information may be provided only to the ASN_GW. The QoS mapping information may include a service profile set (or group) for each user class and a QoS parameter set (or group) for each service profile (or QoS profile).

In step 205, the ASN_GW generates a PDF mapping table according to the QoS mapping information provided from the WSM. In step 207, the BS generates a PDF mapping table according to the QoS mapping information provided from the WSM. As such, in FIG. 2, the PDF exists within an ASN in a form of a mapping table.

In step 209, an MS, which performs an initial network entry, performs a ranging process (i.e., RaNGing-REQuest/RaNGing-ReSPonse (RNG-REQ/RNG-RSP)) process with respect to the BS. In step 211, the MS performs a capability negotiation process (i.e., SS Basic Capability (SBC)-REQ/SBC-RSP). In step 213, the MS performs an authentication process (i.e., Private Key Management (PKM)) on the BS. In this case, the BS interoperates with an AAA server to perform the authentication process of the MS. Upon completing the authentication process, in step 215, the MS performs a registration process (i.e., REG-REQ/REG-RSP), and opens Best Effort (BE) flows for each of a DownLink (DL) and an UpLink (UL). An IP address is allocated by using the flows, and then the initial network entry ends.

The AAA server determines if SFs are statically allocated to the MS. If it is determined that the SFs are statically allocated to the MS, the AAA server transmits to the ASN_GW a DSA trigger request message in step 217. In this case, the AAA server may provide the ASN_GW with one of a user class ID for the MS, multiple service profile IDs to be allocated to the MS, and a QoS parameter set of QoS flows to be allocated to the MS.

In step 219, in response to the DSA trigger request message, the ASN_GW generates an SFID to be allocated to the MS. After generating the SFID, in step 221, the ASN_GW delivers the SFID and the user class ID (or service profile ID) to the BS, and thus transmits the DSA trigger request message. Afterwards, a communication name tag between the ASN_GW and the BS may be determined by using the SFID.

In step 223, the BS obtains necessary QoS parameters (i.e., QoS profiles) from the PDF mapping table (generated in step 207) by using the user class ID (or service profile ID), generates a DSA-REQ message by using the QoS parameters, and transmits the DSA-REQ message to the MS. If the BS does not have the PDF mapping table, the ASN_GW obtains a QoS parameter set for a corresponding SFID by using its own PDF mapping table, and delivers to the BS the DSA trigger request message including the SFID and the corresponding QoS parameter set. In other words, if the BS does not have the PDF mapping table, when the DSA trigger request message is received, the ASN_GW has to provide the BS with the QoS parameters required to generate the DSA-REQ message.

In step 225, the MS generates an SF according to the DSA-REQ message, and, in response thereto, transmits a DSA-RSP message to the BS. In step 227, as an acknowledgement for the DSA-RSP message, the BS transmits a DSA-ACK message to the MS, thereby completing a DSA process. The DSA process (i.e., DSA-REQ/DSA-RSP/DSA-ACK) may be performed a specific number of times corresponding to the number of static SFs allocate to the MS.

In addition, in the DSA process, a service (i.e., BE), in which QoS does not have to be ensured, is set to "admitted" or "active", and thus a TCID can be immediately allocated. That is, when the SF is set to "admitted" or "active", CAC is performed immediately after the DSA process in the initial network entry. If a connection is admitted as a result of the CAC, the SF is activated by allocating the TCID, and otherwise, the SF is dealt with as a provisioned flow. In this case, the SF becomes an active state when traffic flows at the allocated TCID, and otherwise, if traffic does not flow, the SF becomes an admitted state. Although not shown, upon completing the DSA process, the ASN_GW reports a DSA trigger response message to the AAA server, so that accounting is performed. If the QoS setup is carried out by using the policy server (including PDF) instead of the AAA server or the WSM, the DSA trigger response message is also reported to the policy server. If the QoS setup is carried out by the AAA server or the WSM, a DSA interoperation process for generating a QoS SF can be performed prior to an IP allocation process. If the QoS setup is carried out by the policy server, the DSA interoperation process can be performed after the IP allocation process since an IP address may be used as an MS ID.

As such, an exemplary embodiment of the present invention can change the QoS of a statically allocated SF. Specifically, in step 229, the MS determines if a user requests a QoS change. Since the QoS setup is based on a per-flow basis, it is assumed that the QoS change is performed based on a per-flow basis. If the QoS change is requested, the MS transmits a DSC-REQ message including the changed QoS information to the BS in step 231.

In step 233, the BS performs CAC by using the changed QoS information. If a connection is admitted, the BS reports the QoS change information of a corresponding SF of the MS to the ASN_GW in step 239. The QoS change information may comprise a QoS profile. In step 235, in response to the DSC-REQ message, the BS transmits a DSC-RSP message to the MS. In step 237, as an acknowledgement for the DSC-RSP message, the MS transmits a DSC-ACK message to the BS, thereby completing the QoS parameter change.

Although not shown in FIG. 2, the QoS change may be requested by the ASN (i.e., the BS and the ASN_GW). In this case, the DSC process is initiated by the BS. For example, the DSC process can be initiated according to the determination of the BS irrespective of the request of the MS. If a radio resource or a network resource is congested, the BS can arbitrarily change the QoS parameters. For another example, if a QoS parameter (or a CS rule) for an SF is altered due to changes in a policy of a service provider, the BS can change the QoS parameters by initiating the DSC process. In this case, it is assumed that whether the QoS change information is finally admitted or not is determined by using the methods of FIG. 2 to FIG. 6 in a similar manner to the case where the DSC process is initiated by the MS.

A per-flow state (i.e., active, admitted, and provisioned) is changed by performing the DSC process (at the request (transmission) of the MS or at the request (reception) of the BS). In a special occasion, the system and the MS may mutually negotiate so that the per-flow state can be changed in the same manner at both sides without having to perform the DSC process. For example, when the MS transitions from the idle mode to the awake mode, both the BS and the MS can change the per-flow state without having to perform the DSC process.

DSC triggering for SF state transition may be performed when traffic is generated or may be performed at the instruction of a superordinate layer in the following manner.

First, BS_init DSC or MS-init DSC can be performed according to a presence or absence of traffic. A corresponding flow is transitioned from the provisioned state to the active state by the BS_init if DL traffic is generated, or by the MS_init if UL traffic is generated. On the contrary, if per-flow timers exist in both the system and the MS, a state of a corresponding flow can be transitioned to the provisioned state when the timer is expired. In this case, a node that first detects the timer expiration can allow a corresponding flow to transition to the provisioned state by initializing the DSC process.

Second, regarding the BS_init DSC, if the MS transmits a Session Initiation Protocol (SIP) signaling message, an IP Multimedia Subsystem (IMS) server triggers the policy server (i.e., the PDF server), the policy server transmits a DSC trigger instruction to the ASN_GW, and the ASN_GW transmits the DSC trigger instruction to the BS. In this case, if the SF transitions from the provisioned state to the active state, the BS performs CAC. If a connection is admitted, the BS transmits a DSC-REQ message including activation information (including a TCID) to the MS. Then, in response thereto, the MS transmits a DSC-RSP message to the BS.

Third, regarding the MS_mint DSC, if the MS transmits the SIP signaling message to the IMS sever, the IMS server determines authorization, and, if authorized, transmits a response message to the MS. Then, an application layer of the MS triggers a MAC layer to perform the MS_init DSC process, thereby changing a flow state. Even if a traffic flow is terminated for a corresponding SF, the application layer of the MS can perform the MS_init DSC process by triggering the MAC layer.

In addition, the SF can be deleted by performing the DSC process (at the request of the BS or the MS). For example, the BS may determine the deletion of the SF by considering an overhead or the like. In this case, the number of SFs that can be deleted for each user class is assumed to be predetermined according to the QoS profile. When the SF is deleted, the SFID is also deleted from both the ASN and the MS.

In the method of FIG. 2, when a policy (i.e., QoS mapping information) is changed by a service provider (i.e., a Network Service Provider (NSP) or a Network Access Provider (NAP)), the changed QoS mapping information is delivered from the WSM or the AAA server to the ASN. The ASN_GW and the BS update the mapping table according to the changed QoS mapping information.

As such, when the policy (i.e., PDF) is changed, the BS applies a new policy with respect to an SF of a new MS that performs the initial network entry. When the MS performs reconnection or handover, the BS can update a CID by using the RNG-RSP message while transmitting a new QoS parameter to the MS by performing the DSC process. Alternatively, instead of updating the CID, the BS may perform the DSA process a requested number of times. Regarding an MS that is in the awake or sleep mode, the new policy is applied by performing the DSC process, or the initial network entry of the MS is performed. That is, the BS transmits to the MS a message in which a bit indicating QoS policy update is set. The MS can receive the new QoS policy by performing reconnection.

Figure 3:
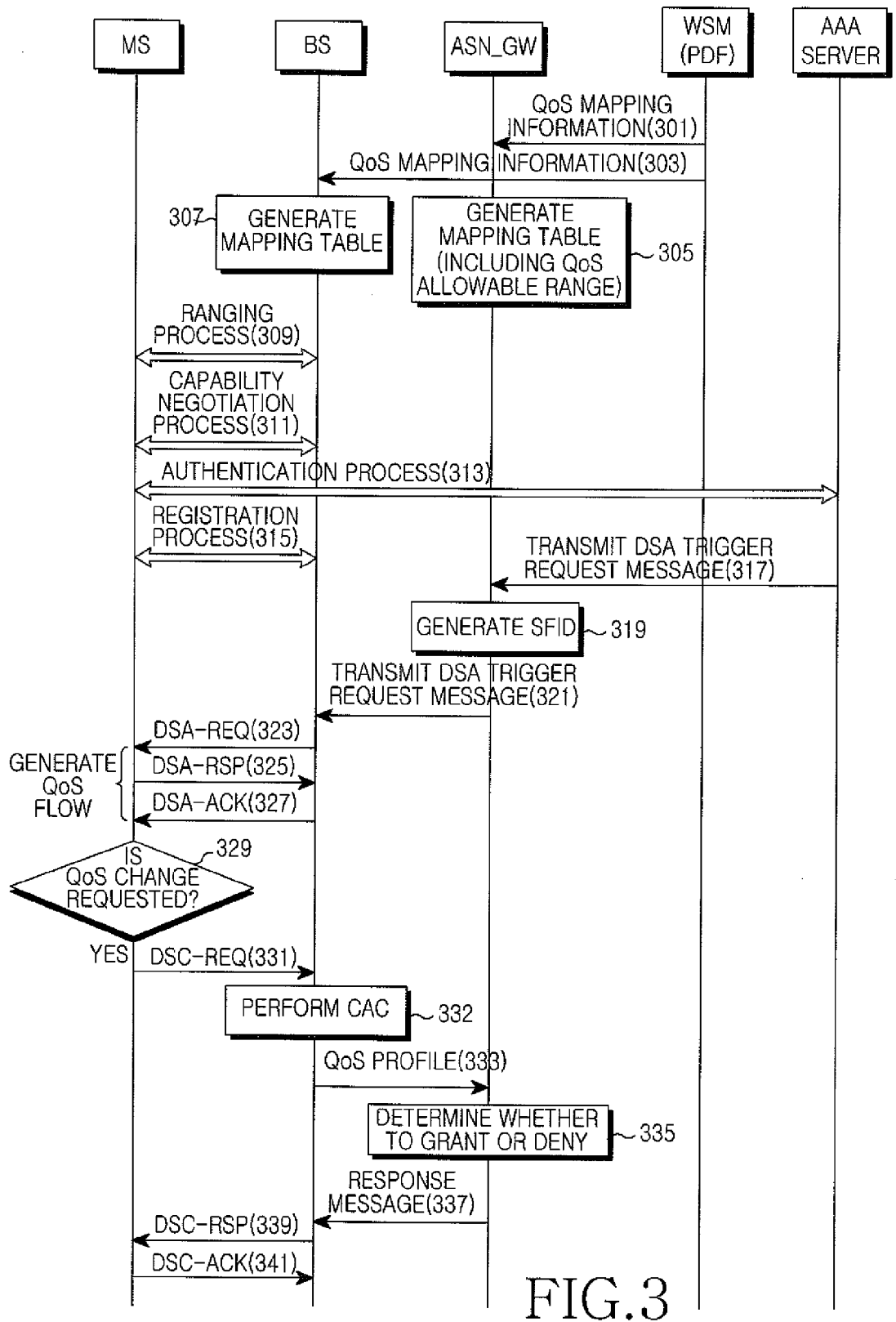
FIG. 3 illustrates a QoS setup process in a wireless network according to another exemplary embodiment of the present invention.

FIG. 3 illustrates a QoS setup process in a wireless network according to another exemplary embodiment of the present invention. In FIG. 3, a PDF is included in a WSM, and whether to perform QoS change is determined by a BS and an ASN_GW. Hereinafter, descriptions of the same elements and operations, which are illustrated in FIG. 2, will be omitted. Thus, the following description will focus on only the elements or operations that are different from those of FIG. 2.

Referring to FIG. 3, the WSM provides QoS mapping information to the ASN_GW in step 301 and to the BS in step 303. In this case, the WSM also delivers information on an allowable range of each QoS parameter to the ASN_GW. In step 305, the ASN_GW generates a mapping table by using the QoS mapping information including the allowable range of each parameter. In step 307, the BS generates a mapping table.

Through steps 309 to 327, which correspond to steps 209 to 227 of FIG. 2, an MS, which performs an initial network entry, is statically allocated with an SF. In step 329, the MS determines if QoS change is requested by a user. If the QoS change is requested, the MS transmits a DSC-REQ message including QoS change information to the BS in step 331.

In step 332, the BS performs CAC by using the changed QoS information. If a connection is admitted, the BS transmits the QoS change information to the ASN_GW in step 333. The QoS change information may comprise a QoS profile. In step 335, the ASN_GW determines if the QoS change information exists within the allowable range stored in the mapping table (generated in step 305). If it exists within the allowable range, the ASN_GW transmits a response message, which grants a QoS change to the BS in step 337. Otherwise, if it does not exist within the allowable range, the ASN_GW transmits a response message, which denies the QoS change to the BS in step 337. Although it has been described that the ASN_GW determines whether to grant or deny the QoS change, in another exemplary embodiment, the ASN_GW may determine whether to grant or deny the QoS change, and, if granted, the BS may perform the CAC.

In step 339, the BS generates a DSC-RSP message according to the response message received from the ASN_GW, and transmits the DSC-RSP message to the MS. In step 341, as an acknowledgement for the DSC-RSP message, the MS transmits a DSC-ACK message to the BS, thereby completing QoS parameter change.

Figure 4:
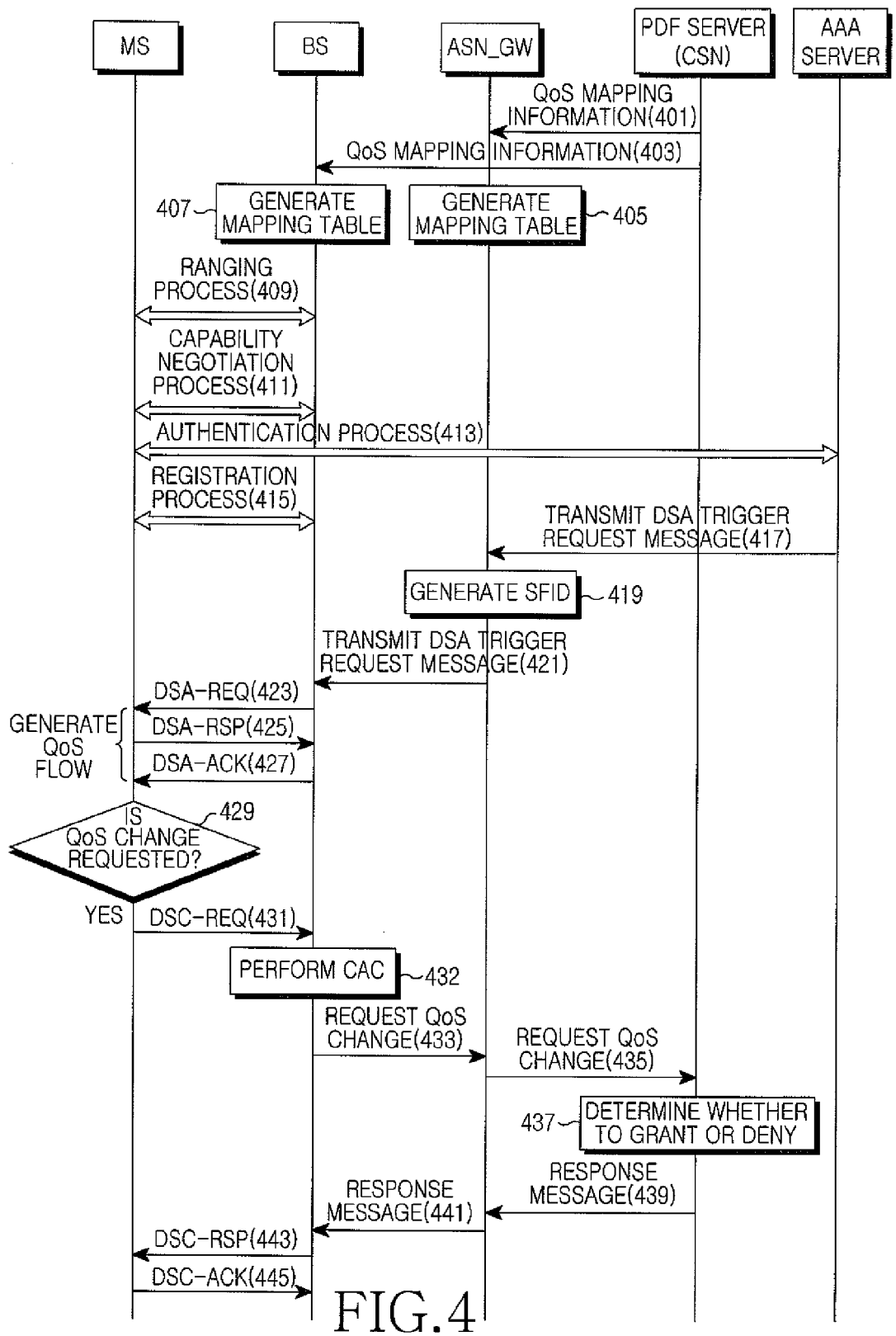
FIG. 4 illustrates a QoS setup process in a wireless network according to another exemplary embodiment of the present invention.

FIG. 4 illustrates a QoS setup process in a wireless network according to another exemplary embodiment of the present invention. In FIG. 4, a PDF server (i.e., a policy server) is additionally provided to a Core Service Network (CSN), and a BS and the policy server determine whether to grant or deny a QoS change. Hereinafter, descriptions of the same elements and operations, which are illustrated in FIG. 2, will be omitted. Thus, the following description will focus on only the elements or operations that are different from those of FIG. 2.

Referring to FIG. 4, the policy server provides an ASN_GW with QoS mapping information input by a service provider (or operator) in step 401. In step 403, the policy server provides the QoS mapping information to the BS. The QoS mapping information may include a service profile set (or group) for each user class and a QoS parameter set (or group) for each service profile. In step 405 the ASN_GW generates a mapping table and in step 407 the BS generates a mapping table.

Through steps 409 to 427, which correspond to steps 209 to 227 of FIG. 2, an MS, which performs an initial network entry, is statically allocated with an SF. In step 429, the MS determines if a QoS change is requested by a user. If the QoS change is requested, the MS transmits a DSC-REQ message including QoS change information to the BS in step 431.

In step 432, the BS performs CAC by using the changed QoS information. If a connection is admitted, the BS transmits the QoS change information to the ASN_GW in step 433. In step 435, the ASN_GW transmits the QoS change information to the policy server. The QoS change information in steps 433 and 435 may be a request for QoS change. In step 437, the policy server determines if the QoS change information exists within the allowable range. If it exists within the allowable range, the policy server transmits a response message, which grants QoS change to the ASN_GW in step 439. Otherwise, if it does not exist within the allowable range, the policy server transmits a response message, which denies the QoS change to the BS in step 439.

In step 441, the ASN_GW transmits to the BS the response message received from the policy server. In step 443, the BS generates a DSC-RSP message according to the response message received from the ASN_GW, and transmits the DSC-RSP message to the MS. In step 445, as an acknowledgement for the DSC-RSP message, the MS transmits a DSC-ACK message to the BS, thereby completing QoS parameter change.

In the method of FIG. 4, when a policy (i.e., QoS mapping information) is changed, the changed QoS mapping information is delivered from the policy server to an ASN. The ASN_GW and the BS update the mapping table according to the changed QoS mapping information. Alternatively, the changed QoS mapping information may be delivered from the policy server to a WSM, and the WSM may deliver the changed QoS mapping information to the ASN.

Figure 5:
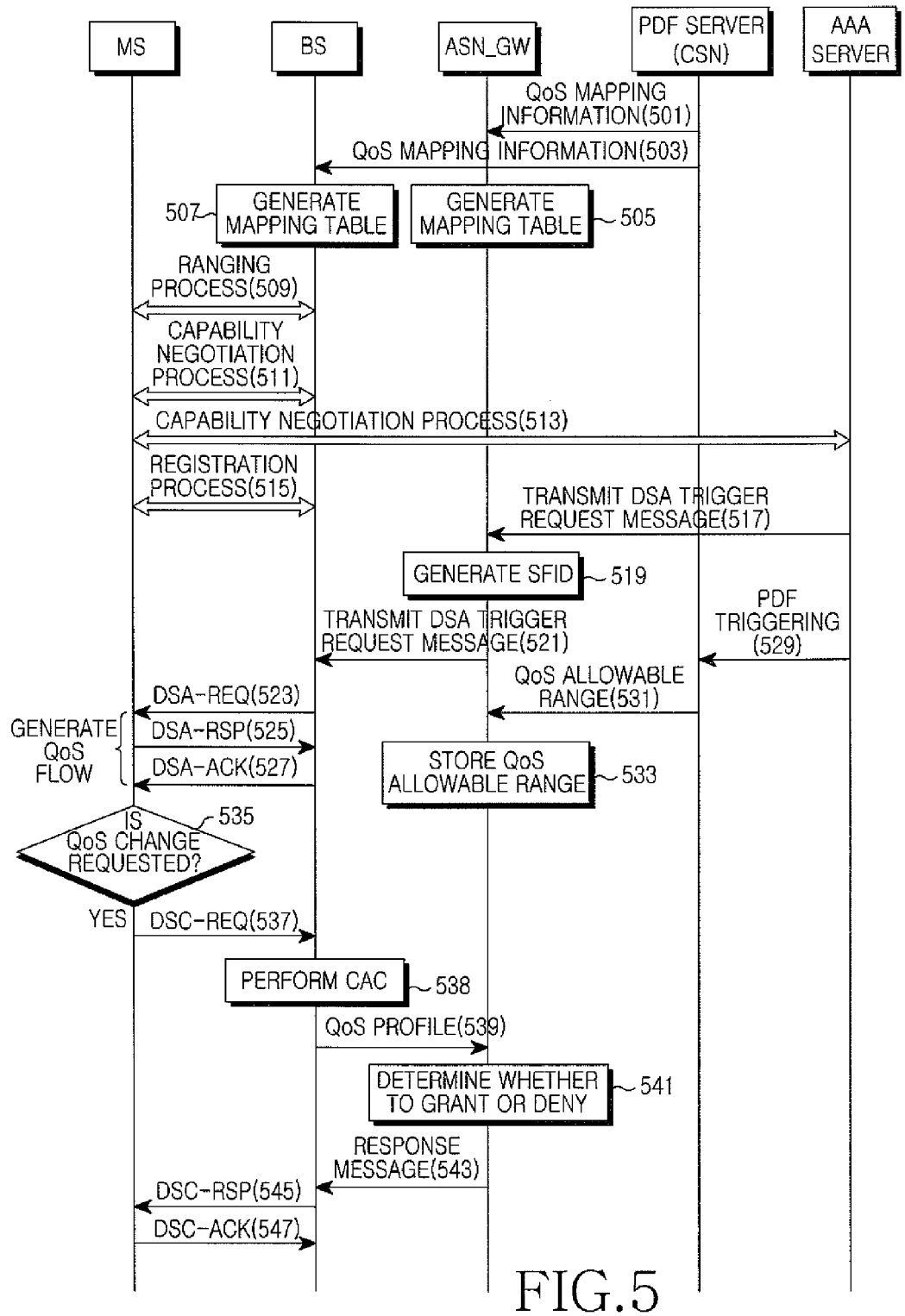
FIG. 5 illustrates a QoS setup process in a wireless network according to another exemplary embodiment of the present invention.

FIG. 5 illustrates a QoS setup process in a wireless network according to another exemplary embodiment of the present invention. In FIG. 5, a PDF server (i.e., a policy server) is additionally provided to a CSN, and a BS and an ASN_GW determine whether to grant or deny a QoS change. Hereinafter, descriptions of the same elements and operations, which are illustrated in FIG. 2, will be omitted. Thus, the following description will focus on only the elements or operations that are different from those of FIG. 2.

Referring to FIG. 5, the policy server provides the ASN_GW with QoS mapping information input by a service provider (or operator) in step 501. In step 503, the policy server provides the QoS mapping information to the BS. The QoS mapping information may include a service profile set (or group) for each user class and a QoS parameter set (or group) for each service profile. In step 505 the ASN_GW generates a mapping table and in step 507 the BS generates a mapping table.

Through steps 509 to 527, which correspond to steps 209 to 227 of FIG. 2, an MS, which performs an initial network entry, is statically allocated with an SF. An AAA server determines if the MS is a subscriber, which statically generates the SF. If it is determined that the MS statically generates the SF, the AAA sever transmits the ASN_GW a DSA trigger request message in step 517, and transmits a message which requests an allowable range of a QoS parameter to the policy server in step 529.

In step 531, the policy server transmits to the ASN_GW the allowable range of the QoS parameter for SFs allocated to the MS. In step 533, the ASN_GW stores the allowable range of the QoS parameter.

In step 535, the MS determines if a QoS change is requested by a user. If the QoS change is requested, the MS transmits a DSC-REQ message including the QoS change information to the BS in step 537.

In step 538, the BS performs CAC by using the changed QoS information. If a connection is admitted, the BS transmits the QoS change information to the ASN_GW in step 539. The QoS change information may comprise a QoS profile. In step 541, the ASN_GW determines if the QoS change information exists within the stored allowable range. If it exists within the allowable range, the ASN_GW transmits a response message, which grants a QoS change to the BS in step 543. Otherwise, if it does not exist within the allowable range, the ASN_GW transmits a response message, which denies the QoS change to the BS in step 543.

In step 545, the BS generates a DSC-RSP message according to the response message received from the ASN_GW, and transmits the DSC-RSP message to the MS. In step 547, as an acknowledgement for the DSC-RSP message, the MS transmits a DSC-ACK message to the BS, thereby completing QoS parameter change.

In the method of FIG. 5, if the PDF is included in the AAA server, when the DSA trigger request message is received in step 517, the allowable range of the QoS parameter can also be provided to the ASN_GW. In this case, step 529 and step 531 can be skipped.

Figure 6:
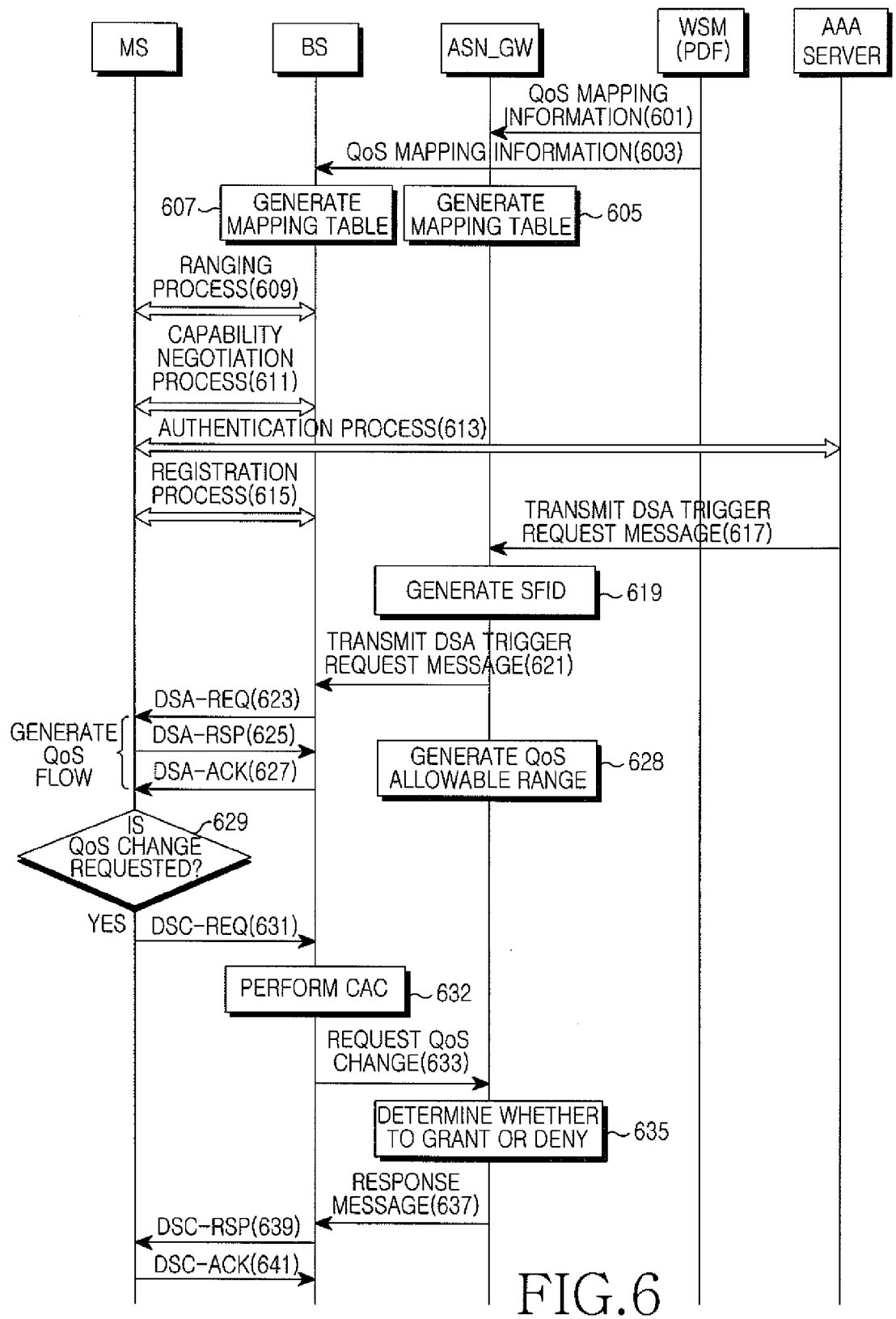
FIG. 6 illustrates a QoS setup process in a wireless network according to another exemplary embodiment of the present invention.

FIG. 6 illustrates a QoS setup process in a wireless network according to another exemplary embodiment of the present invention. In FIG. 6, an allowable range of a QoS parameter is generated when an ASN_GW generates an SFID. Hereinafter, descriptions of the same elements and operations, which are illustrated in FIG. 2, will be omitted. Thus, the following description will focus on only the elements or operations that are different from those of FIG. 2.

Referring to FIG. 6, the ASN_GW in step 601 and a BS in step 603 receive QoS mapping information from a WSM (including PDF) or a policy server existing in a CSN, and stores the QoS mapping information. In step 605 the ASN_GW generates a mapping table and in step 607 the BS generates a mapping table. Through steps 609 to 627, which correspond to steps 209 to 227 of FIG. 2, an MS, which performs an initial network entry, is statically allocated with an SF.

An AAA server determines if the authentication-requested MS is a subscriber, which statically generates the SF. If it is determined that the MS statically generates the SF, the AAA sever transmits the ASN_GW a DSA trigger request message in step 617. In this case, the AAA server also transmits to the ASN_GW an input value (e.g., a user class ID, a service profile ID, etc.) which is required to determine the allowable range of the QoS parameter.

In step 619, in response to the DSA trigger request message, the ASN_GW generates an SFID for the MS. In step 628, the ASN_GW generates the allowable range of the QoS parameter by using the input value delivered from the AAA server. For example, the ASN_GW may receive a mapping relation between the input value and the allowable range of the QoS parameter from the WSM. For another example, the ASN_GW may receive the mapping relation from a specific NE (e.g., the PDF server or the AAA server) of the CSN. While step 628 is illustrated as occurring after step 621, step 628 may occur before step 621 or at substantially the same time as step 619.

In step 629, the MS determines if a user requests a QoS change. If the QoS change is requested, the MS transmits a DSC-REQ message including changed QoS information to the BS in step 631.

In step 632, the BS performs CAC by using the changed QoS information. If a connection is admitted, the BS reports the QoS change information to the ASN_GW in step 633. In step 635, the ASN_GW determines if the QoS change information exists within the allowable range (generated in step 619). The QoS change information in steps 633 may be a request for QoS change. If it exists within the allowable range, the ASN_GW transmits to the BS a response message that grants a QoS change in step 637. Otherwise, if it does not exist within the allowable range, the ASN_GW transmits to the BS a response message, which denies the QoS change in step 637.

In step 639, the BS generates a DSC-RSP message according to the response message received from the ASN_GW, and transmits the DSC-RSP message to the MS. In step 641, as an acknowledgement for the DSC-RSP message, the MS transmits a DSC-ACK message to the BS, thereby completing QoS parameter change.

As described with reference to FIG. 2 to FIG. 6, the PDF may be included in one NE, or may be included in a plurality of NEs. That is, the PDF can be performed in a multi-stage manner. For example, a first PDF may generate an intermediary output value by using an input value, and a second PDF may generate a final output value by using the intermediary output value. Specifically, the first PDF located in the CSN may generate the intermediary output value (i.e., throughput, latency, reliability, etc.) related to priority and performance and may be independent from a wireless network, and the second PDF located in the ASN may use the intermediary output value to generate the final output value that can be applied to the wireless network. Of course, the intermediary output value and the final output value may be identical to each other in some parameters (e.g., a bandwidth). In a typical policy server, application layer parameters are mapped to IP QoS parameters. When the typical policy server is used without alternation, a first PDF that maps the application layer parameters to the IP QoS parameters and a second PDF that re-maps the IP QoS parameters to the QoS parameters may exist. Such a multi-stage PDF may be useful for handover or roaming between networks of different service providers or between networks using different wireless techniques.

Although it has been described above that the AAA server transmits the DSA trigger request message to the ASN_GW, in another embodiment, the WSM may transmit the DSA trigger request message to the ASN_GW. For example, since it can be known whether the MS is a mobile MS or a fixed MS by performing a registration process during the initial network entry (i.e., MS_init REG), the WSM can generate a value indicating the number of times DSA has been performed and can generate a QoS profile in a different manner by determining mobility or immobility of the MS.

In another embodiment, the policy server (including PDF) which determines a QoS policy may integrally perform static QoS setup. That is, the QoS setup may be carried out in such a manner that, during the initial network entry, the AAA server (or the SPR server) may trigger the policy server after the authentication process, or the ASN_GW may trigger the policy server after allocating an IP to the MS, so that at least one per-flow QoS information allowed for the MS and a CS rule are delivered to the ASN_GW. In general, the policy server does not manage an MS ID. Thus, the MS ID has to be inquired to another NE (e.g., the AAA or the SPR server). Since an MS IP address is dynamically allocated, the IP address is managed by a Home Agent (HA) and is difficult to be managed by the SPR server, which interoperates with the policy server. Since a Network Access Identifier (NAI) is managed by the SPR server, when the policy server integrally manages the setup of all QoS flows, the NAI may be used as the MS ID.

Now, a method of operating a per-user mode (i.e., an awake mode, a sleep mode, and an idle mode) together with a per-flow state (i.e., an active state, an admitted state, and a provisioned state) will be described.

The active state is defined as a state in which an SFID, a TCID, and a radio resource are allocated according to a result obtained by performing CAC. The admitted state is defined as a state in which the SFID and the TCID are allocated and in which the radio resource is reserved but is not allocated. The provisioned state is defined as a state in which the SFID is allocated but the TCID is not allocated while maintaining only information on a QoS parameter and a CS rule. The radio resource that is reserved but is not allocated can be used for Best Effort (BE) flows.

For all flows, a timer for state transition (e.g., active→admitted, active→provisioned, admitted→provisioned, etc.) may be managed.

Each SF state operates according to a user mode in the following manner. When the MS is in the awake mode, the SF state operates as described above. When the MS is in the sleep mode, during a sleep period, a flow in the active state only reserves resources and does not allocate the resources, and, during a listening period, the flow can allocate the resources. When the MS is in the idle mode, a per-flow state in the awake mode is stored, and reserved or allocated resources are all released. When transitioned from the idle mode to the awake mode, a stored previous per-flow state is restored, and CAC is performed when the previous per-flow state is the active state or the admitted state. In this case, denied SFs are transitioned to the provisioned state by the system and the MS without performing a DSC process.

It is assumed herein that the sleep mode allows transmission of bearer traffic with a communication interval.

Figure 7:
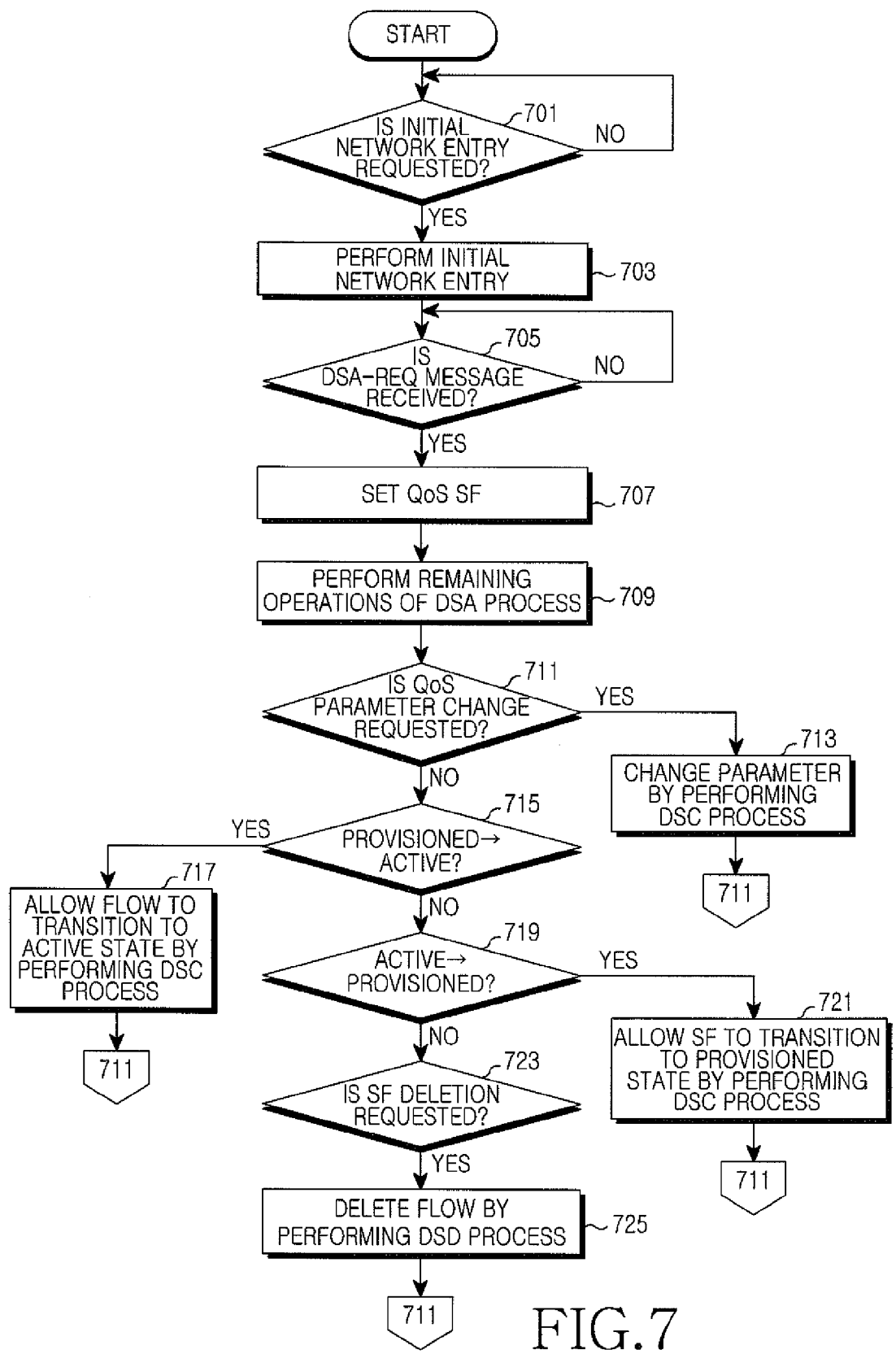
FIG. 7 is a flowchart illustrating an operation of a Mobile Station (MS) in a Broadband Wireless Access (BWA) system according to an exemplary embodiment of the present invention.

FIG. 7 is a flowchart illustrating an operation of an MS in a BWA system according to an exemplary embodiment of the present invention.

Referring to FIG. 7, the MS determines if an initial network entry is requested in step 701. If the initial network entry is requested, the MS performs the initial network entry in step 703. The initial network entry may include a ranging process, a basic capability negotiation process, an authentication process, a registration process, etc.

Upon completing the initial network entry, for a DSA process, the MS determines if a DSA-REQ message is received from a BS in step 705. It is assumed herein that the MS generates a static SF. That is, the DSA-REQ message includes a QoS parameter set for each statically generated SF. In this case, the state of the generated SF may be a provisioned or pre-provisioned state.

Upon receiving the DSA-REQ message, in step 707, the MS obtains a QoS profile (the QoS parameter set for each SF) from the DSA-REQ message, and generates a QoS SF according to the QoS profile.

After generating the QoS SF, the MS performs the remaining operations of the DSA process (i.e., DSA-RSP/DSA-ACK) in step 709. As such, the MS generates a static SF through the initial network entry.

In step 711, the MS determines if a user requests a QoS change. The QoS change can be performed not only when the SF is in the provisioned or pre-provisioned state, but also when the SF is in the active state or the admitted state. When the QoS change is requested, the MS performs a DSC process with respect to the BS to change QoS in step 713. Then, the procedure returns to step 711. In this case, whether to grant or deny QoS change information requested by the MS is determined by the BS or an NE having a PDF. QoS change can be performed according to the determination result.

In step 715, the MS determines if SF activation is requested. If the SF activation is requested, proceeding to step 717, the MS performs the DSC process with respect to the BS, and allows the SF to transition to the active state. Then, the procedure returns to step 711. In other words, by performing the DSC process, a TCID is allocated by the BS, and the TCID is used for traffic communications.

In step 719, the MS determines if there is a request for transitioning the SF from the active state to the provisioned state. For example, when the MS transitions to the idle mode, all flows in the active state can be transitioned to the provisioned state. For another example, for the flow in the active state, a timer operates while there is no traffic flow, and the SF in the active state can be transitioned to the provisioned state when the timer is expired. As such, when there is a request for transitioning to the provisioned state, in step 721, the MS performs the DSC process with respect to the BS, and allows the SF to transition to the provisioned state. Then, the procedure returns to step 711.

In step 723, the MS determines if SF deletion is requested. If the SF deletion is requested, proceeding to step 725, the MS performs a DCD process with respect to the BS, and thus deletes the SF. Then, the procedure returns to step 711.

Figure 8:
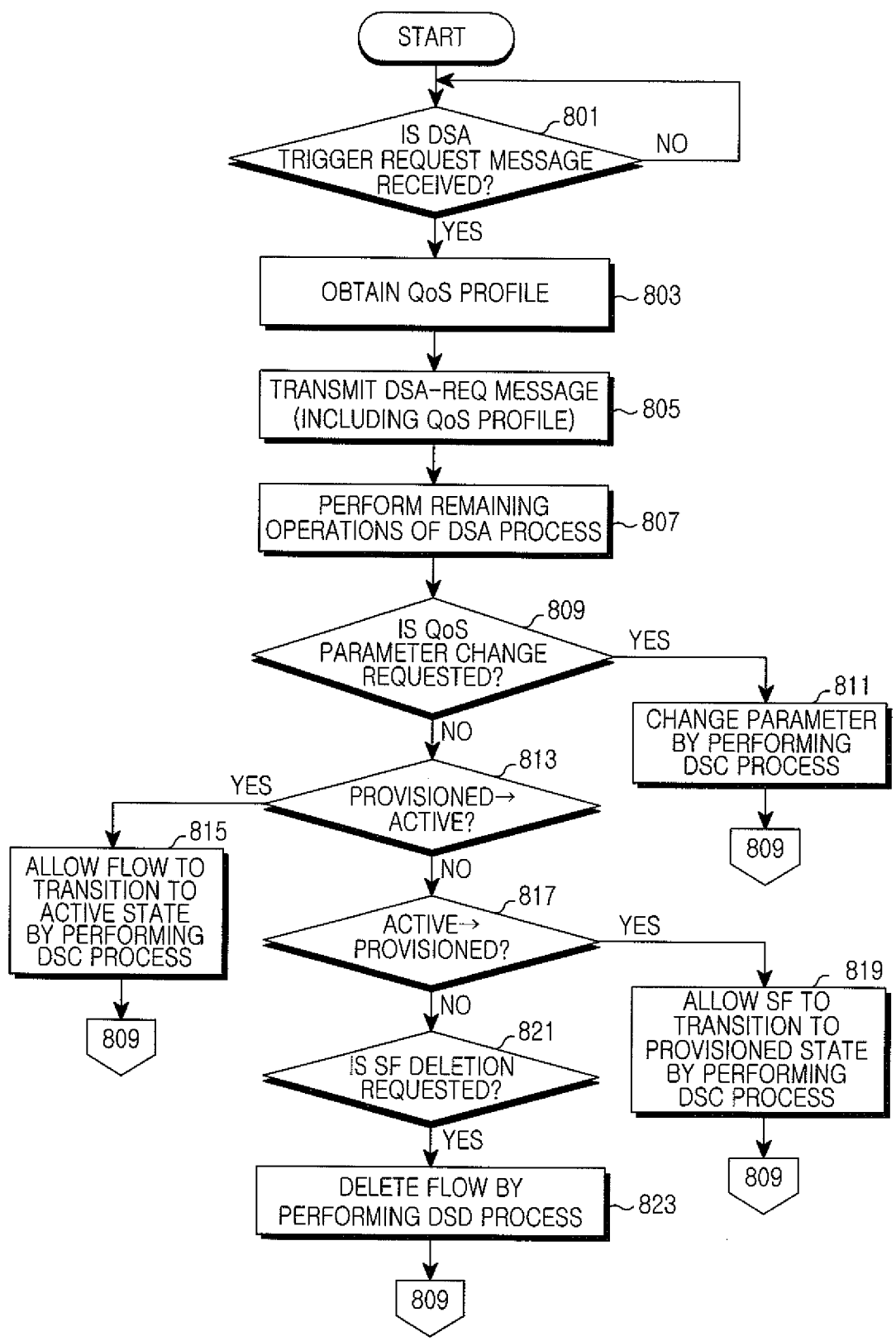
FIG. 8 is a flowchart illustrating an operation of a Base Station (BS) in a BWA system according to an exemplary embodiment of the present invention.

FIG. 8 is a flowchart illustrating an operation of a BS in a BWA system according to an exemplary embodiment of the present invention.

Referring to FIG. 8, for a DSA process, the BS determines if a DSA trigger request message is received for a specific MS from an ASN_GW in step 801. The DSA trigger request message includes an SFID statically generated for the MS and a PDF input value (i.e., a user class ID or a service profile ID) for searching for a QoS profile. If the BS does not include a PDF mapping table, the DSA trigger request message includes the SFID and a corresponding QoS parameter set.

If the DSA trigger request message is received, the BS obtains a necessary QoS profile from the PDF mapping table by using the input value in step 803. That is, the QoS parameter set for each SFID is obtained. In step 805, the BS generates a DSA-REQ message by using the obtained QoS profile, and transmits the DSA-REQ message to the MS. In step 807, the BS performs the remaining operations of the DSA process (i.e., DSA-RSP/DSA-ACK) and generates a static SF for the MS.

In step 809, the BS determines if QoS change is requested according to a current system state or at the request of the MS. The QoS change can be performed not only when the SF is in the provisioned or pre-provisioned state but also when the SF is in the active state or the admitted state. When the QoS change is requested, in step 811, the BS performs CAC by using QoS change information, and, if a connection is admitted, performs a DSC process with respect to the MS. Then, the procedure returns to step 809. In this case, whether to grant or deny QoS change information is determined by the BS or an NE having a PDF. QoS change can be performed according to the determination result.

In step 813, the BS determines if SF activation is requested. For example, the SF has to be activated when traffic to be delivered to the MS is generated. If the SF activation is requested, proceeding to step 815, the BS performs the DSC process with respect to the MS, and allows the SF to transition to the active state. Then, the procedure returns to step 809. In other words, by performing the DSC process, a TCID is allocated to the MS, and the TCID is used for traffic communications.

In step 817, the BS determines if there is a request for transitioning the SF from the active state to the provisioned state. For example, when the MS transitions to the idle mode, all flows in the active state can be transitioned to the provisioned state. For another example, for the flow in the active state, a timer operates while there is no traffic flow, and the SF in the active state can be transitioned to the provisioned state when the timer is expired. As such, when there is a request for transitioning to the provisioned state, in step 819, the BS performs the DSC process with respect to the MS, and allows the SF to transition to the provisioned state. Then, the procedure returns to step 809.

In step 821, the MS determines if SF deletion is requested. If the SF deletion is requested, proceeding to step 823, the BS performs a DCD process with respect to the MS, and thus deletes the SF. Then, the procedure returns to step 809.

Exemplary operations related to semi-dynamic QoS setup in a BWA communication system have been described above. Hereinafter, exemplary structures of an MS and a BS that are used in the semi-dynamic QoS setup will be described. The MS and the BS have similar structures when comprising the similar interface modules (i.e., communication modules). Therefore, the structures of the MS and the BS will be described with reference to an apparatus of FIG. 9.

Figure 9:
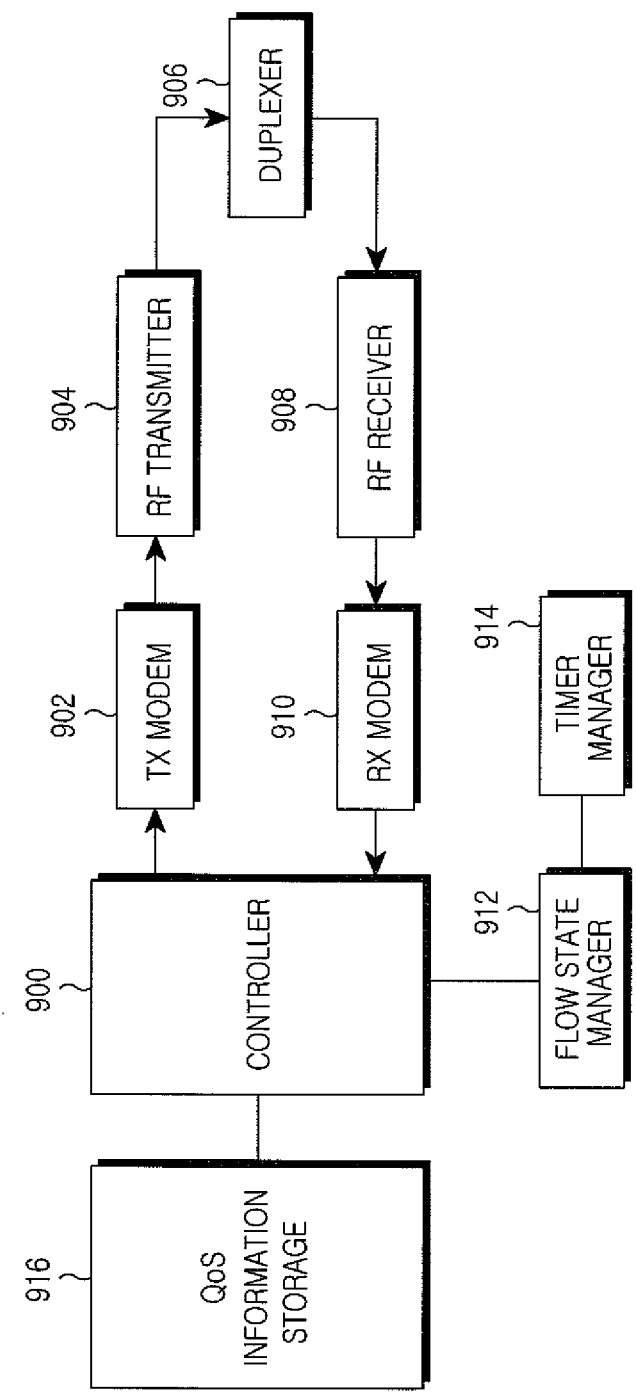
FIG. 9 is a block diagram illustrating a structure of an MS (or a BS) in a BWA system according to an exemplary embodiment of the present invention.

FIG. 9 is a block diagram illustrating a structure of an MS (or a BS) in a BWA system according to an exemplary embodiment of the present invention.

Referring to FIG. 9, the MS (or the BS) includes a controller 900, a Transmit (Tx) modem 902, a Radio Frequency (RF) transmitter 904, a duplexer 906, an RF receiver 908, a Receive (Rx) modem 910, a flow state manager 912, a timer manager 914, and a QoS information storage 916.

First, the structure of the MS will be described.

The Tx modem 902 includes a channel coding block and a modulation block. The Tx modem 902 modulates a message received from the controller 900 into a baseband signal, and outputs the baseband signal. The channel coding block may include a channel encoder, an interleaver, and a modulator. The modulation block may include an Inverse Fast Fourier Transform (IFFT) operator for carrying Tx data on a plurality of orthogonal sub-carriers. The structure above is for an Orthogonal Frequency Division Multiplexing (OFDM) system. When a Code Division Multiple Access (CDMA) is used, the IFFT operator may be replaced with a code spreading modulator.

The RF transmitter 904 includes a frequency converter and an amplifier. The RF transmitter 904 converts the baseband signal received from the Tx modem 902 into an RF signal, and outputs the RF signal. The duplexer 906 transmits a Tx signal (i.e., a UL signal) received from the RF transmitter 904 through an antenna according to a duplexing scheme, and provides an Rx signal (a DL signal) received through an antenna to the RF receiver 908. The RF receiver 908 includes an amplifier and a frequency converter. The RF receiver 908 converts the RF signal that has passed through a wireless channel into a baseband signal, and outputs the baseband signal.

The Rx modem 910 includes a demodulation block and a channel decoding block. The Rx modem 910 demodulates a signal received from the RF receiver 908 into a baseband signal, and outputs the baseband signal. The Rx modem 910 may include an FFT operator for extracting data carried on each sub-carrier. The channel decoding block may include a demodulator, a de-interleaver, and a channel decoder.

The controller 900 processes and controls overall operations for a QoS service. According to an exemplary embodiment of the present invention, the controller 900 obtains a QoS profile (a QoS parameter set for each SF) from a DSA-REQ message received from a BS during an initial network entry, and generates a QoS SF according to the QoS profile. A state of the generated SF may be a provisioned (or pre-provisioned) state. Further, the controller 900 stores the QoS profile in the QoS information storage 916.

When service activation is requested, the controller 900 performs a DSC process with respect to the BS and thus allows the SF to transition to an active state. When QoS change is requested for the SF, the controller 900 performs a DSC process with respect to the BS and thus changes the QoS of the SF. When the SF is requested to transition from the active state to the provisioned state, the controller 900 performs the DSC process with respect to the BS and thus allows the SF to transition to the provisioned state. When SF deletion is requested, the controller 900 performs the DSD process with respect to the BS and thus deletes the SF.

The flow state manager 912 manages a statue of each SF statically generated. The SF state may be classified into the active state, the provisioned (or pre-provisioned) state, and an admitted state. The timer manager 914 operates a timer required to manage the SF state. That is, the timer manager 914 drives a corresponding timer under the control of the flow state manager 912, and when the timer is expired, the timer manager 914 reports the timer expiration to the flow state manager 912. Then, the flow state manager 912 performs a state transition process according to the timer expiration. For example, when there is no traffic flow for the SF in the active state, the timer may be driven, and when the timer is expired, the SF may be transitioned from the active state to the provisioned state. In this case, to transition the SF from the active state to the provisioned state, the MS may perform the DSC process with respect to the BS.

Now, the structure of the BS will be described.

The Tx modem 902, the RF transmitter 904, the duplexer 906, the RF receiver 908, and the Rx modem 910 have substantially similar functions and operations as described above. Thus, detailed descriptions thereof will be omitted.

The QoS information storage 916 manages QoS policy information received from a policy server or an NE (including PDF) of another network in a form of a mapping table (i.e., a PDF mapping table).

The flow state manager 912 manages a parameter set for each SF generated for each MS and a state of each SF. The SF state may be classified into an active state, a provisioned (or pre-provisioned) state, and an admitted state. The timer manager 914 operates a timer required to manage the SF state. That is, the timer manager 914 drives a corresponding timer under the control of the flow state manager 912, and when the timer is expired, the timer manager 914 reports the timer expiration to the flow state manager 912. Then, the flow state manager 912 performs a state transition process according to the timer expiration.

The controller 900 processes and controls overall operations for a QoS service. When a DSA trigger request message is received for a specific MS from an ASN_GW, the controller 900 obtains a QoS parameter set for each SF generated for the MS by using the PDF mapping table stored in the QoS information storage 916, generates a DSA-REQ message by using the obtained parameter set for each SF, and transmits the DSA-REQ message to the MS. As such, the controller 900 generates a QoS SF by performing a DSA process, and stores information on the generated SF in the flow state manager 912.

When service activation is requested, the controller 900 performs a DSC process with respect to the MS and thus allows the SF to transition to an active state. When QoS change is requested for the SF, the controller 900 performs a DSC process with respect to the MS and thus changes the QoS of the SF. When the SF is requested to transition from the active state to the provisioned state, the controller 900 performs the DSC process with respect to the MS and thus allows the SF to transition to the provisioned state. When SF deletion is requested, the controller 900 performs the DSD process with respect to the MS and thus deletes the SF.

Although it has been described above that a QoS parameter set is determined for each SF in an exemplary embodiment of the present invention, the QoS parameter set may be determined in a different manner according to a data type within an SF in another exemplary embodiment of the present invention. For example, the importance of various types of data delivered through one SF may differ from one data to another. In this case, since a relatively high level QoS has to be ensured for important data, a QoS level needs to be determined differently for each data type. For another example, when a plurality of sessions (e.g., voice, video, etc.) exists within one SF, QoS needs to be set up differently for each session.

As such, when a QoS parameter set is determined for each data type, the parameter set for each data type can be recorded in a corresponding message (e.g., DSA-REQ) in an array format. In this case, a reference QoS parameter set can be fully recorded in a first array, and parameters other than the reference QoS parameter set can be recorded in the remaining arrays. When there is a QoS parameter (e.g., indicating whether to use TEK, the number of times of transmitting HARQ, etc.) used for each data type in addition to commonly used QoS parameters, the QoS parameter can be recorded separately for each data type.

According to an exemplary embodiment of the present invention, a QoS SF can be allocated to an MS by using an interoperation process. In addition, since the QoS SF is statically allocated and a desired SF is selectively activated, a radio resource can be effectively used. In addition, since QoS parameter change is granted for the statically allocated QoS SF, there is an advantage in that a QoS service can be provided in a more flexible manner. In addition, since a call processing interface can be used without alteration and information delivery between interfaces can be simplified, there is an advantage in that latency (i.e., processing latency and transmission latency) can be minimized.

While the invention has been shown and described with reference to certain exemplary embodiments thereof, it will be understood by those skilled in the art that various changes in form and details may be made therein without departing from the spirit and scope of the invention as defined by the appended claims and their equivalents. Therefore, the scope of the invention is defined not by the detailed description of the invention but by the appended claims and their equivalents, and all differences within the scope will be construed as being included in the invention.

What is claimed is:

1. A method of setting up Quality of Service (QoS) in a wireless communication system, the method comprising:
    during an initial network entry, creating at least one static Service Flow (SF) by receiving a QoS profile from a Base Station (BS);

if a QoS change is requested for the SF, transmitting, by a Mobile Station (MS), to the BS a service change request message including QoS change information; and by the BS, determining if the QoS change information is admitted, and, if admitted, transmitting a service change response message to the MS, and changing a QoS of the SF, wherein the QoS profile is originated from a WiBro System Manager (WSM) and the at least one static SF is determined to be statically allocated to the MS by an Authentication, Authorization, and Accounting (AAA) server, and wherein the QoS change is determined whether to be allowable by at least one of a Network Entity (NE) and an Access Service Network-GateWay (ASN GW) and the determination result is transmitted to the BS.

2. The method of claim 1, wherein the changing of the QoS comprises:

upon receiving the service change request message, performing Connection Admission Control (CAC) by the BS;

if a connection is admitted, transmitting the service change response message by the BS to the MS; and reporting changed QoS information by the BS to the ASN_GW.

3. The method of claim 1, wherein the changing of the QoS comprises:

receiving information on an allowable range of a QoS parameter by an ASN_GW from the NE including a Policy Decision Function (PDF);

upon receiving the service change request message, performing CAC by the BS;

if a connection is admitted, transmitting the QoS change information by the BS to the ASN_GW;

by the ASN_GW, determining if the QoS change information exists within the allowable range, and, if the QoS change information exists within the allowable range, transmitting to the BS a response message which grants the QoS change; and upon receiving the response message, transmitting the service change response message by the BS to the MS.

4. The method of claim 1, wherein the changing of the QoS comprises:

upon receiving the service change request message, performing CAC by the BS;

if a connection is admitted, transmitting the QoS change information by the BS to the NE including a PDF;

by the NE, determining if the QoS change information exists within the allowable range, and, if the QoS change information exists within the allowable range, transmitting to the BS a response message which grants the QoS change; and upon receiving the response message, transmitting the service change response message by the BS to the MS.

5. The method of claim 1, wherein the changing of the QoS comprises:

performing authentication on the MS and triggering a policy server by an authentication sever;

transmitting, by the policy server, information on an allowable range of a QoS parameter of the MS to the ASN_GW;

upon receiving the service change request message, performing CAC by the BS;

if a connection is admitted, transmitting by the BS to the ASN_GW the QoS change information;

by the ASN_GW, determining if the QoS change information exists within the allowable range, and, if the QoS change information exists within the allowable range, transmitting to the BS a response message which grants the QoS change; and upon receiving the response message, transmitting the service change response message by the BS to the MS.

6. The method of claim 1, wherein the changing of the QoS comprises:

by an authentication server, performing authentication on the MS and transmitting a PDF input parameter to the ASN_GW;

by the ASN_GW, generating information on an allowable range of a QoS parameter of the MS by using the PDF input parameter;

upon receiving the service change request message, performing CAC by the BS;

if a connection is admitted, transmitting the QoS change information by the BS to the ASN_GW;

by the ASN_GW, determining if the QoS change information exists within the allowable range, and, if the QoS change information exists within the allowable range, transmitting to the BS a response message which grants the QoS change; and upon receiving the response message, transmitting the service change response message by the BS to the MS.

7. The method of claim 6, wherein the PDF input parameter comprises at least one of a user class IDentifier (ID) and a service profile ID.

8. The method of claim 1, wherein a state of the created static SF comprises at least one of a provisioned state and a pre-provisioned state.

9. The method of claim 1, wherein the QoS profile comprises at least one Service Flow IDentifier (SFID) and a QoS parameter set for the SFID.

10. The method of claim 1, wherein the QoS profile comprises at least one of, for each SF, an Internet Protocol (IP) QoS parameter, a Media Access Control (MAC) QoS parameter, a parameter indicating at least one of a compression and non-compression of an IP header and a compression scheme, a parameter indicating at least one of use and non-use of a Traffic Encryption Key (TEK), a parameter indicating whether a current state comprises a pre-provisioned state, a parameter selecting at least one of a provisioned state, an admitted state, and an active state when the current state does not comprise the pre-provisioned state, a parameter indicating at least one of grant and denial of QoS change by using Dynamic Service Change (DSC), a parameter indicating the number of times of changing a QoS in the active state, a parameter indicating a processing scheme for a QoS parameter which is not exchanged by using the DSC, a parameter indicating a required reliability, a parameter indicating a condition for compulsory call release, a parameter indicating a retransmission scheme, a parameter indicating a processing scheme when the number of users in the active state in a serving BS exceeds a threshold, a parameter indicating whether a symmetric QoS flow is provided, a parameter indicating a possible maximum number of times of using the DSC, a parameter indicating at least one of grant and denial of a flow timer and a timer value, a parameter indicating a possibility of a horizontal handover, a parameter indicating a possibility of a vertical handover, and a parameter indicating at least one of grant and denial of Dynamic Service Delete (DSD).

11. The method of claim 1, wherein the creating of the SF comprises:
performing an initial network entry by the MS and the BS;
during the initial network entry, by an authentication server, performing authentication on the MS and transmitting a service addition trigger request message to the ASN_GW;
by the ASN_GW, generating an SFID of the at least one SF in response to the service addition trigger request message, and obtaining a QoS profile from a PDF mapping table by using a received PDF input value;
by the ASN_GW, transmitting to the BS the service addition trigger request message including the SFID and the QoS profile;
by the BS, transmitting to the MS the service addition trigger request message including the SFID and the QoS profile; and
by the MS, generating at least one static SF by using the QoS profile, and, in response thereto, transmitting a service addition response message to the BS.

12. The method of claim 11, wherein, when the service addition trigger is requested, the authentication server provides the ASN_GW with at least one of a user class ID, QoS IDs of SFs to be created, and a QoS parameter set for the SFs to be created.

13. The method of claim 1, further comprising:
if the QoS change is requested for the SF, transmitting by the BS to the MS the service change request message including QoS change information; and
by the MS, changing the QoS of a corresponding SF according to the service change request message, and, in response thereto, transmitting the service change response message to the BS.

14. The method of claim 1, further comprising:
if the QoS change is requested for the SF, transmitting by the BS to the MS a message which requests an updating of a QoS policy; and
by the MS, performing re-entry according to the message, and receiving QoS information that is updated by performing the re-entry.

15. The method of claim 1, wherein the at least one SF is managed in at least one of an active state, an admitted state, and a provisioned state.

16. The method of claim 1, further comprising:
if a state transition is requested for the SF, transmitting a Session Initiation Protocol (SIP) message by the MS to an IP Multimedia Subsystem (IMS) server;
transmitting a service change trigger request message by the IMS server to the ASN_GW, and transmitting the service change trigger request message by the ASN_GW to the BS; and
by the BS, determining if the service change is admitted, and, if admitted, transmitting to the MS a service change request message that instructs a state transition of the SF.

17. The method of claim 1, further comprising:
if a state transition is requested for the SF, transmitting a SIP message by the MS to the IMS server;
by the IMS server, examining authorization and transmitting to the MS a SIP response message that indicates if an authorization is granted;
by an application layer of the MS, triggering an MAC layer and transmitting a service change request message to the BS; and
by the BS, determining if a state transition of the SF is admitted, and, if admitted, transmitting to the MS a service change response message that instructs the state transition of the SF so that the state of the SF is transitioned.

18. A wireless communication system comprising:
a Mobile Station (MS) for creating at least one static Service Flow (SF) by receiving a Quality of Service (QoS) profile from a Base Station (BS) during an initial network entry, and, if a QoS change is admitted for the SF, for transmitting a service change request message including QoS change information to the BS; and
the BS for determining if the QoS change information is admitted, and, if admitted, for transmitting a service change response message to the MS,
wherein the QoS profile is originated from a WiBro System Manager (WSM) and the at least one static SF is determined to be statically allocated to the MS by an Authentication, Authorization, and Accounting (AAA) server, and
wherein the QoS change is determined whether to be allowable by at least one of a Network Entity (NE) and an Access Service Network-GateWay (ASN_GW) and the determination result is transmitted to the BS.

19. The system of claim 18, wherein the BS performs Connection Admission Control (CAC) in response to the service change request message, and, if a connection is admitted, transmits the service change response message to the MS.

20. The system of claim 18, further comprising an Access Service Network-GateWay (ASN_GW) for receiving and storing information on an allowable range of an QoS parameter from the NE including a Policy Decision Function (PDF), for determining if the QoS change information received from the BS exists within the allowable range, and, if the QoS change information exists within the allowable range, for transmitting to the BS a response message which grants the QoS change.

21. The system of claim 18, further comprising a policy server for determining if the QoS change information received from the BS exists within the allowable range, and, if the QoS change information exists within the allowable range, for transmitting to the BS a response message that grants the QoS change.

22. The system of claim 18, further comprising:
an authentication server for performing authentication on the MS and for triggering a policy server when the authentication is successful;
the policy server for transmitting to the ASN_GW the information on the allowable range of the QoS parameter of the MS in response to the triggering; and
the ASN_GW for determining if the QoS change information received from the BS exists within the allowable range, and, if the QoS change information exists within the allowable range, for transmitting to the BS a response message that grants the QoS change.

23. The system of claim 18, further comprising:
an authentication server for performing authentication on the MS and for transmitting a PDF input parameter to the ASN_GW if the authentication is successful; and
the ASN_GW for generating information on an allowable range of a QoS parameter of the MS by using the PDF input parameter, for determining if the QoS change information received from the BS exists within the allowable range, and, if the QoS change information exists within the allowable range, for transmitting to the BS a response message which grants the QoS change.

24. The system of claim 18, wherein a state of the created static SF comprises at least one of a provisioned state and a pre-provisioned state.

25. The system of claim 18, wherein the QoS profile comprises at least one Service Flow IDentifier (SFID) and a QoS parameter set for the SFID.

26. The system of claim 18, wherein the QoS profile comprises at least one of, for each SF, an Internet Protocol (IP) QoS parameter, a Media Access Control (MAC) QoS parameter, a parameter indicating at least one of compression and non-compression of an IP header and a compression scheme, a parameter indicating at least one of use and non-use of a Traffic Encryption Key (TEK), a parameter indicating whether a current state comprises a pre-provisioned state, a parameter selecting at least one of a provisioned state, an admitted state and an active state when the current state does not comprise the pre-provisioned state, a parameter indicating at least one of grant and denial of QoS change by using Dynamic Service Change (DSC), a parameter indicating the number of times of changing QoS in the active state, a parameter indicating a processing scheme for a QoS parameter which is not exchanged by using the DSC, a parameter indicating a required reliability, a parameter indicating a condition for compulsory call release, a parameter indicating a retransmission scheme, a parameter indicating a processing scheme when the number of users in the active state in a serving BS exceeds a threshold, a parameter indicating whether a symmetric QoS flow is provided, a parameter indicating a possible maximum number of times of using the DSC, a parameter indicating at least one of grant and denial of a flow timer and a timer value, a parameter indicating a possibility of a horizontal handover, a parameter indicating a possibility of a vertical handover, and a parameter indicating at least one of grant and denial of Dynamic Service Delete (DSD).

27. The system of claim 18, further comprising:
an authentication server for performing authentication on the MS and transmitting a service addition trigger request message to the ASN_GW during the initial network entry; and
the ASN_GW for generating an SFID of the at least one SF in response to the service addition trigger request message, for obtaining a QoS profile from a PDF mapping table by using a received PDF input value, and for transmitting to the BS the service addition trigger request message including the SFID and the QoS profile.

28. The system of claim 27, wherein, when the service addition trigger request message is transmitted, the authentication server provides the ASN_GW with at least one of a user class ID, QoS IDs of SFs to be created, and a QoS parameter set for the SFs to be created.

29. The system of claim 18, wherein, if QoS change is requested for the SF, the BS transmits to the MS a service change request message including QoS change information.

30. The system of claim 18, wherein, upon receiving a message which requests update of a QoS policy from the BS, the MS performs re-entry and receives QoS information which is updated by performing the re-entry.

31. The system of claim 18, wherein the at least one SF is managed in at least one of an active state, an admitted state, and a provisioned state.

32. The system of claim 18, further comprising:
an IP Multimedia Subsystem (IMS) server for transmitting a service change trigger request message to the ASN_GW upon receiving from the MS a Session Initiation Protocol (SIP) message which requests a state transition of the SF; and
the ASN_GW for transmitting the service change trigger request message from the IMS server to the BS,
wherein the BS determines if the service change is admitted, and, if admitted, transmits to the MS a service change request message that instructs a state transition of the SF.

33. The system of claim 18, further comprising
an IMS server for examining authorization upon receiving from the MS a SIP message which requests a state transition of the SF and for transmitting to the MS a SIP response message which includes an authorization result,
wherein the MS transmits a service change request message which requests the state transition of the SF to the BS in response to the SIP response message received from the IMS server.

34. A method of setting up Quality of Service (QoS) of an Access Service Network (ASN), the method comprising:
creating at least one static Service Flow (SF) for a Mobile Station (MS) which performs an initial network entry;
receiving from the MS a service change request message including QoS change information for the static SF;
determining if the QoS change is admitted; and
if the QoS change is admitted, transmitting a service change response message to the MS,
wherein the at least one static SF is determined to be statically allocated to the MS by an Authentication, Authorization, and Accounting (AAA) server, and
wherein the QoS change is determined whether to be allowable by a Network Entity (NE) or an Access Service Network-GateWay (ASN_GW) and the determination result is transmitted to the Base Station (BS).

35. The method of claim 34, wherein, in the determining if the QoS change is admitted, upon receiving the service change request message, performing Connection Admission Control (CAC).

36. The method of claim 34, wherein the determining if the QoS change is admitted comprises:
provisioning an allowable range of a QoS parameter;
upon receiving the service change request message, performing CAC; and
if a connection is admitted, determining if the QoS change information exists within the allowable range.

37. The method of claim 34, wherein the determining if the QoS change is admitted comprises:
provisioning an allowable range of a QoS parameter;
upon receiving the service change request message, determining if the QoS change information exists within the allowable range; and
if the QoS change information exists within the allowable range, performing CAC.

38. The method of claim 34, wherein a state of the created static SF comprises at least one of a provisioned state and a pre-provisioned state.

39. The method of claim 34, further comprising, if a QoS change is requested for the SF, transmitting to the MS the service change request message which requests a service change and includes QoS change information.

40. The method of claim 34, further comprising, if a QoS change is requested for the SF, transmitting to the MS a re-entry request message for updating a QoS policy.

41. The method of claim 34, further comprising managing the at least one SF in any one of an active state, an admitted state, and a provisioned state.

* * * * *